United States Patent
Parupudi et al.

(10) Patent No.: US 7,076,255 B2
(45) Date of Patent: *Jul. 11, 2006

(54) CONTEXT-AWARE AND LOCATION-AWARE CELLULAR PHONES AND METHODS

(75) Inventors: Gopal Parupudi, Issaquah, WA (US); Stephen S. Evans, Redmond, WA (US); Edward F. Reus, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/746,918

(22) Filed: Dec. 22, 2000

(65) Prior Publication Data

US 2002/0119788 A1    Aug. 29, 2002

Related U.S. Application Data

(63) Continuation-in-part of application No. 09/543,646, filed on Apr. 5, 2000, now Pat. No. 6,327,535.

(51) Int. Cl.
*H04Q 7/20*  (2006.01)
*H04M 1/00*  (2006.01)
*H04B 1/38*  (2006.01)

(52) U.S. Cl. .............. 455/456.1; 455/456.3; 455/456.6; 455/418; 455/414.1; 455/565; 455/567; 701/207; 701/214

(58) Field of Classification Search ............ 455/456, 455/457, 418, 419, 420, 414, 524, 565, 456.1–456.6, 455/414.1, 414.2; 340/994, 995, 825.36, 340/825.49; 379/211, 912; 342/357, 107–109, 342/450–465; 701/200–221
See application file for complete search history.

(56) References Cited

U.S. PATENT DOCUMENTS

| 4,845,744 | A |   | 7/1989 | DeBenedictis |
| 5,224,100 | A |   | 6/1993 | Lee et al. |
| 5,224,150 | A | * | 6/1993 | Neustein ............... 455/565 |
| 5,230,048 | A |   | 7/1993 | Moy |

(Continued)

FOREIGN PATENT DOCUMENTS

EP        0817444        1/1998

(Continued)

OTHER PUBLICATIONS

Nelson G. J., "Context-Aware and Location Systems", Ph. D. dissertation, University of Cambridge, Jan. 1998.*

(Continued)

*Primary Examiner*—Duc M. Nguyen
(74) *Attorney, Agent, or Firm*—Lee & Hayes, PLLC

(57) ABSTRACT

Context-aware and location-aware cellular phones and methods are described. In one embodiment, cellular phones are configured to wirelessly receive information that pertains to their current context or location. The phones then automatically use the information to modify one or more cellular phone behaviors, e.g. by turning the phone off, changing the ringer's pitch, or placing the phone in a vibrate mode. In one particular embodiment, various location types are defined and have associated attributes that define a desired cellular phone behavior. One or more transmitters at a location for which a behavior is desired transmit information that pertains to the location's class type. The cell phones can carry an association of class types and their behaviors so that when the phones receive the class type information, they can automatically adjust their behavior.

40 Claims, 15 Drawing Sheets

U.S. PATENT DOCUMENTS

| | | | |
|---|---|---|---|
| 5,230,072 A | 7/1993 | Smith et al. | |
| 5,285,261 A | 2/1994 | Dumoulin | |
| 5,295,261 A | 3/1994 | Simonetti | |
| 5,319,775 A | 6/1994 | Loges et al. | |
| 5,321,815 A | 6/1994 | Bartolanzo, Jr. et al. | |
| 5,442,805 A * | 8/1995 | Sagers et al. | 455/456.5 |
| 5,479,476 A * | 12/1995 | Finke-Anlauff | 455/456 |
| 5,499,032 A | 3/1996 | Kelley et al. | |
| 5,539,922 A | 7/1996 | Wang | |
| 5,611,050 A | 3/1997 | Theimer et al. | |
| 5,635,940 A | 6/1997 | Hickman et al. | |
| 5,644,740 A | 7/1997 | Kiuchi | |
| 5,717,387 A | 2/1998 | Suman et al. | |
| 5,752,243 A | 5/1998 | Reiter et al. | |
| 5,774,540 A * | 6/1998 | Davidson et al. | 379/387 |
| 5,794,142 A * | 8/1998 | Vanttila et al. | 455/419 |
| 5,806,017 A | 9/1998 | Hancock | |
| 5,870,751 A | 2/1999 | Trotter | |
| 5,917,911 A | 6/1999 | Dabbish et al. | |
| 5,937,164 A | 8/1999 | Mages et al. | |
| 5,945,985 A | 8/1999 | Babin et al. | |
| 5,948,040 A | 9/1999 | DeLorme et al. | |
| 5,953,722 A | 9/1999 | Lampert et al. | |
| 5,991,756 A | 11/1999 | Wu | |
| 6,011,973 A * | 1/2000 | Valentine et al. | 455/456.6 |
| 6,018,570 A | 1/2000 | Matison | |
| 6,028,551 A | 2/2000 | Schoen et al. | |
| 6,031,545 A | 2/2000 | Ellenby et al. | |
| 6,054,989 A | 4/2000 | Robertson et al. | |
| 6,057,845 A | 5/2000 | Dupouy | |
| 6,078,826 A * | 6/2000 | Croft et al. | 455/574 |
| 6,088,717 A | 7/2000 | Reed et al. | |
| 6,091,956 A | 7/2000 | Hollenberg | |
| 6,104,344 A * | 8/2000 | Wax et al. | 342/378 |
| 6,104,980 A | 8/2000 | Sato et al. | |
| 6,125,446 A | 9/2000 | Olarig et al. | |
| 6,127,947 A | 10/2000 | Uchida et al. | |
| 6,128,759 A | 10/2000 | Hansen | |
| 6,148,261 A | 11/2000 | Obradovich et al. | |
| 6,151,601 A | 11/2000 | Papierniak et al. | |
| 6,160,553 A | 12/2000 | Robertson et al. | |
| 6,166,738 A | 12/2000 | Robertson et al. | |
| 6,185,569 B1 | 2/2001 | East et al. | |
| 6,188,405 B1 | 2/2001 | Czerwinski et al. | |
| 6,201,973 B1 * | 3/2001 | Kowaguchi | 455/456.6 |
| 6,216,087 B1 | 4/2001 | Want et al. | |
| 6,233,448 B1 * | 5/2001 | Alperovich et al. | 455/417 |
| 6,243,093 B1 | 6/2001 | Czerwinski et al. | |
| 6,249,252 B1 | 6/2001 | Dupray | |
| 6,279,007 B1 | 8/2001 | Uppala | |
| 6,281,896 B1 | 8/2001 | Alimpich et al. | |
| 6,292,833 B1 | 9/2001 | Liao et al. | |
| 6,300,936 B1 | 10/2001 | Braun et al. | |
| 6,307,573 B1 | 10/2001 | Barros | |
| 6,313,791 B1 | 11/2001 | Klanke | |
| 6,321,092 B1 | 11/2001 | Fitch et al. | |
| 6,327,535 B1 * | 12/2001 | Evans et al. | 701/300 |
| 6,343,291 B1 | 1/2002 | Goldman | |
| 6,359,892 B1 | 3/2002 | Szlam | |
| 6,374,177 B1 | 4/2002 | Lee et al. | |
| 6,389,288 B1 * | 5/2002 | Kuwahara et al. | 455/456 |
| 6,401,051 B1 | 6/2002 | Merriam | |
| 6,405,020 B1 | 6/2002 | Oestreich et al. | |
| 6,411,220 B1 | 6/2002 | Davis et al. | |
| 6,411,899 B1 | 6/2002 | Dussell et al. | |
| 6,418,533 B1 | 7/2002 | Angelo et al. | |
| 6,421,072 B1 | 7/2002 | Ku et al. | |
| 6,421,544 B1 * | 7/2002 | Sawada | 455/565 |
| 6,421,716 B1 | 7/2002 | Eldridge et al. | |
| 6,442,620 B1 | 8/2002 | Thatte et al. | |
| 6,462,706 B1 | 10/2002 | Decker | |
| 6,466,918 B1 | 10/2002 | Spiegel et al. | |
| 6,470,344 B1 | 10/2002 | Kothuri et al. | |
| 6,470,354 B1 * | 10/2002 | Aldridge et al. | 707/103 Y |
| 6,513,059 B1 | 1/2003 | Gupta et al. | |
| 6,522,875 B1 | 2/2003 | Dowling et al. | |
| 6,525,768 B1 | 2/2003 | Obradovich | |
| 6,553,310 B1 | 4/2003 | Lopke | |
| 6,581,062 B1 | 6/2003 | Draper et al. | |
| 6,594,666 B1 | 7/2003 | Biswas et al. | |
| 6,625,615 B1 | 9/2003 | Shi et al. | |
| 6,628,928 B1 | 9/2003 | Crosby et al. | |
| 6,748,225 B1 | 6/2004 | Kepler | |
| 6,750,883 B1 | 6/2004 | Parupudi et al. | |
| 6,823,354 B1 | 11/2004 | Kynast et al. | |
| 6,918,537 B1 | 7/2005 | Graves et al. | |
| 2002/0029291 A1 | 3/2002 | Crandall | |
| 2002/0081984 A1 | 6/2002 | Liu | |
| 2002/0111715 A1 | 8/2002 | Richard | |
| 2002/0119788 A1 | 8/2002 | Parupudi et al. | |
| 2002/0120370 A1 | 8/2002 | Parupudi et al. | |
| 2002/0122055 A1 * | 9/2002 | Parupudi et al. | 345/737 |
| 2002/0156870 A1 | 10/2002 | Boroumand et al. | |
| 2005/0091223 A1 | 4/2005 | Shaw et al. | |

FOREIGN PATENT DOCUMENTS

| | | |
|---|---|---|
| WO | WO 97/41654 | 11/1997 |
| WO | WO 99 55102 A | 10/1999 |
| WO | WO 99/65207 | 12/1999 |
| WO | WP 00/70504 | 11/2000 |

OTHER PUBLICATIONS

Bahl P. and Padmanabhan V., "User Location and tracking in an In-building Radio Network", Technical Report MSR-TR-99-12, MicroSoft Research, Feb. 1999.*

G. Coulouris et al, "FLAME : An Open Framework for Location-Aware Systems", Dept. of Eng., Cambridge University, Cambridge UK, 2004.*

Yasuto Nakanishi et al, "Context Aware Messaging Service: A Dynamical Messaging Delivery Using Location Information and Schedule Information," Personal Technologies (2000) 4:221-224.

Jason Pascoe et al., "Issues in Developing Context-Aware Computing," Handheld and Ubiquitous Computing, First International Symposium, HUC'99 Karlsruhe, Germany, Sep. 27-29, 1999 Proceedings, pp. 208-221.

Erno Kovacs et al., "Adaptive Mobile Access to Context-aware Services," IEEE 1999, pp. 190-201.

D. Abowd, "Context-Awareness in Wearable and Ubiquitous Computing," Virtual Reality (1998) 3:200-211.

Dix et al., "Exploiting Space and Location as a design ramework for Interactive Mobile Systems" vol. 7, No. 3, Sep. 2000 ACM, pp. 285-321.

Karimi and Liu, "A Predictive Location Model for Location-Based Services," 2003 ACM, pp. 126-133.

S. Pokraev, PD Costa, JG Pereira Filho, M. Zuidweg, JW Koolwaaij, & M Van Setten., "Context-Aware Services," From Colophon—Nov. 30, 2003, Telematica Institute.

Maass, Henning, "Location-aware mobile applications based on directory services," Mobile Networks and Applications 3, 1998, pp. 157-173.

Chatschik Bisdikian et al., "WiSAP: A Wireless Personal Access Network for Handheld Computing Devices," IEEE Personal Communications, Dec. 1998, vol. 5 No. 6, pp. 18-25.

C.P. Louwrens and S.H. von Solms, "Selection of secure single sign-on solutions for heterogeneous computing environments," Part One Secure Information Systems, IFIP 1997, pp. 9-24.

Andrew J. Mazeikis and Glenn H. MacEwen, "A Communication Protocol for a Multi-Level Secure Network," Proceedings of TriComm '91 IEEE Conference on Communications Software: Communications for Distributed Applications & Systems, Chapel Hill, NC Apr. 18-19, 1991, pp.

Lawton et al., "An Interactive Model Based Vision System for Vehicle Tracking," 1993, pp. 403-409.

Eckstein et al., "Architecture for computer vision application development with the HORUS system," Apr. 1997, pp. 244-261.

Kuikka et al., "Transformation of structured documents," Electronic Publishing, vol. 8(4), Dec. 1995, pp. 319-341.

de Nitto Persone, et al. "Modeling and Evaluation of Prefetching Policies for Context-Aware Information Services," 1998, pp. 55-65.

Brown et al., "Context-Aware Applications: From the Laboratory to the Marketplace," Oct. 1997, pp. 58-64.

Halang et al., "High Accuracy Concurrent Event Processing in Hard Real-Time Systems," 1997, pp. 77-94.

Fulton, Jennifer, "Computer Maintenance, Part 1 First Step: Spring Cleaning," TOGGLE, Dec. 1999, pp. 1-3.

Chalmers, Dan, Sloman, Morris; QoS and Context Awareness for Mobile Computing; pp. 380-382; Handheld and Ubiquitous Computing; First International Symposium, HUC 1999; Sep. 27-29, 1999; Karlsruhe, Germany.

Abowd, Gregory D.; Software Design Issues for Ubiquitous Computing; IEEE 1998; pp. 104-109; Georgia Institute of Technology.

Schilit, Bill, Adams, Norman, Want, Roy; Context-Aware Computing Applications; IEEE 1995; pp. 85-90; Palo Alto Research Center, Palo Alto, CA & Computer Science Dept. Columbia University, NY, NY.

Hansson, Hans A. et al., "BASEMENT a Distributed Real-Time Architecture for Vehicle Applications," Proceedings of the Real-Time Technology and Applications Symposium (RTAS '95), 1995 IEEE, pp. 220-229.

Schilit, Bill N. and Theimer, Marvin M., "Disseminating Active Map Information to Mobile Hosts," IEEE Network, IEEE Inc. New York, US, vol. 8, No. 5, Sep. 1, 1994, pp. 22-32, XP000611167 ISSN: 0890-8044.

Sanchez, J. Alfredo et al., "Mutant: Agents as Guides for Multiple Taxonomies in the Floristic Digital Library," Digital 99 Libraries, 4th ACM Conference on Digital Libraries, Proceedings of 1999 Conference on Digital Libraries, Aug. 11-14, 1999, 'Online!', pp. 244-245.

* cited by examiner

CONTEXT-AWARE AND LOCATION-AWARE CELLULAR PHONES AND METHODS

CROSS-REFERENCE TO RELATED APPLICATIONS

This is a Continuation-in-Part of application Ser. No. 09/543,646 filed Apr. 5, 2000 now U.S. Pat. No. 6,327,535.

TECHNICAL FIELD

This invention relates to generally to the area of context-aware computing or ubiquitous computing.

BACKGROUND

The World Wide Web (WWW) was created to make content available from any source in any location around the world. Users of the Web are able to generally access a seemingly infinite number of resources via the Web. The Web has been highly successful in this regard. Yet, with the evolution of the Web, certain needs remain largely unmet. Specifically, people continue to have a need to access information that has a contextual aspect to it. That is, often times, individuals will find themselves in a computing environment that carries with it a certain context. Yet, the context of the environment cannot be easily incorporated into the present computing environment. As an example, consider the context of location. People generally have a need to access information, data, resources and the like, that have geographic dimensions to them. For example, individuals may desire to take advantage of services or products that are close in proximity to where they currently are located. In this regard, it is desirable to understand the individual's contextual location so that services, goods and the like can be made available to the individual. As "eCommerce" continues to grow in importance, the necessity of bringing people, places, services and goods together in an efficient manner will become critically important.

To date, many attempts have been made to bring people, places, services and goods together. These various attempts have generally approached the problem from different directions in an often times incompatible manner. As an example, consider the context of location. Some services have attempted to bring people and services together by defining large databases that maintain information about the services. For example, a list of restaurants may be maintained in a web accessible database where each restaurant is associated with a zip code in which the restaurant is located. When a user desires to locate a particular restaurant, they might simply enter the zip code where they are located to see a list of corresponding restaurants in that zip code. From the list of restaurants, they might be able to select one or two restaurants of interest. This approach is undesirable for a number of reasons. First, the operation of the system is dependent upon a central server that is responsible for receiving user queries and executing the queries to return the information to the user. In the event the server fails, so too does the service. In addition, this particular service might be suited to finding restaurants, but possibly not other businesses. In addition, the granularity with which the results are returned to the user may foist some of the search burden on the user (i.e. the user gets a list of restaurants in a nearby zip code, but has to further explore the list to select which ones are of interest). Further, the list of restaurants may include some restaurants that are blocked by some type of a physical barrier (i.e. a river, mountain, etc.) that makes the distance, as the crow flies, unroutable.

Providers of services and products want to be connected to nearby end-users. End-users want to consume these services and goods at the closest and most convenient location. Acquiring the services of a dentist or a plumber that lives somewhere "out on the net" is not appropriate if you need them to fill a cavity or unclog a sink. Looking for the nearest hotdog while in a stadium requires you to stay in the stadium.

There is an unsolved need to be able to create context-aware computing in which computing devices can participate in their particular context. In specific circumstances, there are needs to provide relational position awareness among physical locations in both public and private views of the world. To date, however, there is no one standardized view of the world that would unlock the potential of context-aware computing. Context-aware computing is much more than just position awareness—although this is a very big field in and of itself.

This invention arose out of concerns associated with developing a standardized, context-aware infrastructure and related systems to unlock the potential of context-aware computing.

SUMMARY

Context-aware and location-aware cellular phones and methods are described. In one embodiment, cellular phones are configured to wirelessly receive information that pertains to their current context or location. The phones then automatically use the information to modify one or more cellular phone behaviors, e.g. by turning the phone off, changing the ringer's pitch, or placing the phone in a vibrate mode. In one particular embodiment, various location types are defined and have associated attributes that define a desired cellular phone behavior. One or more transmitters at a location for which a behavior is desired transmit information that pertains to the location's class type. The cell phones can carry an association of class types and their behaviors so that when the phones receive the class type information, they can automatically adjust their behavior.

DETAILED DESCRIPTION

Overview

Figure 1:
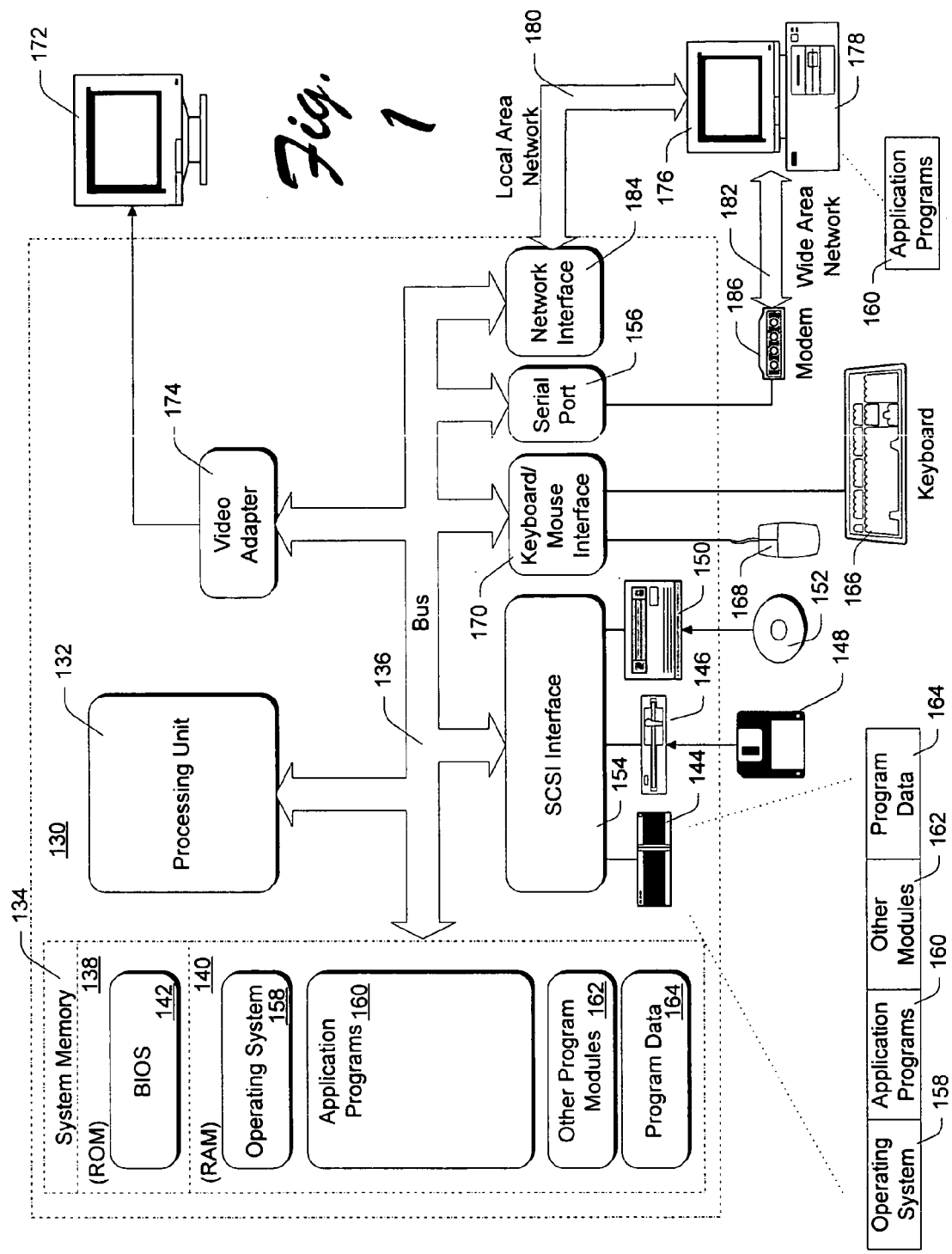
FIG. 1 is a diagram of an exemplary computing device that can be used in accordance with the described embodiments.

To provide a standardized solution, embodiments described just below provide a uniform definition of the world. The uniform definition is defined in terms of a hierarchical tree of nodes, where each node represents some aspect of the world. Each node is connected to at least one other node by a branch. An exemplary classification of nodes takes place on a physical level (e.g. physical locations such as political entities, infrastructure entities and public places), as well as a non-physical level (e.g. military APOs). This hierarchical nodal structure is referred to as the Master World, and is a standardized view worldwide. Each node of the Master World has various attributes associated with it that assist in context-aware computing. Exemplary attributes include a unique ID, name, geographic entity class, latitude/longitude, relative importance, contextual parents to name just a few. The Master World is useful because it can be used to determine the relative location of a place anywhere in the world and at any definable granularity.

Once an individual's location or a place an individual is interested in is determined, various services that reference the location can be offered to the individual based on their location. That is, value is provided by the Master World model in the ability to tie services to nodal locations in the Master World.

Building on this concept, two additional concepts add value—the concept of so-called Secondary Worlds and a "geozone."

A Secondary World is a powerful computing mechanism whereby individual entities (such as businesses or organizations) can define their own particular worlds that need not necessarily conform to the Master World view of the world. That is, while the Master World is essentially a physical hierarchical representation of the world, the Secondary Worlds can be physical and/or logical representations of each individual entities' world view. One particularly useful aspect of the Secondary World is that it links, at at least one point, into the Master World. Thus, within any Secondary World, a user's location not only within the Secondary World, but the Master World as well can be determined. Various services can be attached to the nodes of the Secondary World. Based upon a user's calculated position, these various services that are associated with Secondary World nodes can be offered to the user. In addition, because the user's context is determined relative to the Master World, other services that may not be associated with a particular Secondary World can be offered.

A geozone is essentially a spatial indexing mechanism by which the Master World is subdivided into individual zones. In the described embodiment, the zones are subdivided through the use of a quadtree algorithm that is dependent on a density function (although many other spatial index approaches can also be used). Once a desired density level is achieved (density might be defined in terms of points of interest per zone), each node on the Master World is assigned a particular geozone. Geozones enable proximity calculations to be computed in a fast and straight forward manner.

A useful aspect of the Master and Secondary Worlds are that they are "reachable" from various computing devices such as stationary (i.e. desktop devices) or mobile computing devices (i.e. cell phones, laptops etc.). That is, the Master World (or at least a portion of it) and one or more Secondary Worlds can be either locally maintained on the computing device, or accessed, e.g. via the Web or some other mechanism, so that a user can derive their context. For example, the Secondary World can be downloaded onto the computing device so that a user can derive their context within the Secondary World. Once a user's context is determined from the Master World and one or more Secondary Worlds, a various robust collection of context-aware solutions become available to the user. For example, specific Secondary World services can be offered or Master World services can be offered. Additionally, services from other Secondary Worlds might also be offered since the user's location may be known (or made known) to these other Secondary Worlds. In this way, the Master World can link two or more Secondary Worlds together.

Another aspect is that the described embodiments harness the computing power of each computing device in determining the device's location. Here, by virtue of having the Master World and one or more Secondary Worlds reachable by the device (and possibly locally maintained on the device), the device itself determines its own context.

One embodiment provides a client side device that is configured to utilize the context-aware structures that are discussed above, i.e. the Master and one or more Secondary Worlds. The Master World or a portion thereof can be locally available on the device or can be accessible at another location, e.g. via the Web. In this embodiment, the client device has a location service embodied thereon. The described location service is a software module that can determine the location of the device and can answer queries from various applications (either executing on the device or off the device). The location service determines the location of the device by using the Master World and one or more Secondary Worlds. The applications query the location service through one or more Application Program Interfaces (APIs) or Events to get location information that is used by the applications to render a service.

The location service makes use of one or more location providers that convey information to the device. This information can be information that is specific to the location provider, or can be information that can be mapped directly into a node of the Master World or Secondary Worlds. Exemplary location providers can include Global Positioning Service (GPS) providers, cell phone providers (cell providers), Bluetooth providers, a user interface provider and the like. The location providers provide information that gives some aspect of a device's current location. This information is used by the location service to ascertain the location of the device.

One particularly advantageous feature of the client device is a standard or common location provider interface. The location provider interface enables the various location providers to provide information to the location service so that the location service can use the information to determine its location. Essentially, the multiple location provider interface is a common interface that enables multiple different location providers to provide location information (or hints) about location to a location service that is on a device. The location providers can provide the location information constantly, at intervals, or when polled by the device. The location information can be provided with confidence and accuracy estimates to enable the location service to evaluate the relative quality of the information before it is used. The various providers also have the ability to self-monitor themselves which assists in the providers' ability to intelligently convey information to the location service. By having a common interface, the collection of location providers is dynamically extensible—that is location providers can be added or removed from the collection of location providers without any interference of the functionality performed by the location service or device. The location providers can be added or removed while the device is operating. This is particularly useful in accommodating location providers that are developed in the future. In this particular embodiment, two levels of abstraction are provided i.e. (1) the provider interface that receives information from the location providers and (2) the API/events layer that enables applications to get at the various information.

One focus of this embodiment is a device that can collect context information (e.g. location information) from a variety of different sources, determine the device's current context from that information, and provide the current context at some level to one or more applications that can use the device's context to render a service or enable the device to participate in its context environment.

In the described embodiment, the device receives location information or hints about its location. This information is collated and mapped by the location service into a node in the Master World and/or Secondary World. The hierarchical trees can then be traversed to determine the device's accurate location in both the Secondary World and the Master World. At this point, the device has determined its context. The information that is collected can be subject to arbitration to ensure that only highly trusted information is used to determine context. The location information can be cached to provide "current location information" which, for a definable period of time will be accurate to some degree. Thus, if for some reason other location providers are unavailable, the cache can be used to ascertain location.

Once a device's location is determined, the device can apply a security policy to the information. Once this is done, the device can begin to answer queries from various applications.

One aspect of the described embodiment is a "favorite locations" aspect in which the device can be automatically configured, when it determines its context, so that it can adjust to the different locations.

Further, various types of location providers can convey different types of information. For example, a so-called "thin provider" provides location information that is translated by the location service into the appropriate node information. A so-called "thick provider" includes logic that takes location information and provides it in a form that can map directly into the Master World or Secondary World.

In another embodiment location translation services are provided that are directed to determining, as accurately as possible, the context or location of the device. In this embodiment, information is received from the various location providers. This information includes location, accuracy and confidence (all of which are provided by the location provider), trust (which is assigned to a location provider by the device or a user) and a timestamp (which helps to age the location information). The location translation processing involves determining which of the location providers are valid and active. The location providers can be ranked in accordance with the confidence and trust levels. This defines an ordered list of location providers. Provision is made for a situation in which all of the location providers may go inactive. If so, a "current location" is used as a location provider whose confidence decreases over time.

In the event that information from two or more of the location providers conflicts, then measures can be taken to use information for which there is a higher level of trust. The information that is provided by all of the location providers (assuming no conflict) can then be used to determine a tree structure and a node's entity ID (EID). The tree might be the Master World and the EID is a node on the Master World. The tree might also be a Secondary World and the EID (or location unique indentifier or "LUID") is a node on the Secondary World. Once this information is collected, complete location information can be determined by simply traversing the tree(s). Once a device's location is determined, a cache can be updated with the current location (including a time stamp).

In another embodiment, privacy issues in the context-aware computing environment are addressed. In this embodiment, the location service has acquired location information that pertains to the location of a particular device. A privacy manager determines what level of information to provide to applications that might request the information. The privacy manager can reside on the computing device itself, or can be proxied by a trusted third party.

According to this embodiment, a scale of privacy levels are defined. Each level is defined to include more or less specific information about the location of a particular device. A user is able to assign a privacy level to entities that might request location information. Additionally, each node of the Master World and a Secondary World can have a privacy level associated with it. When a query from an application is received, the privacy manager first determines who the query is from and the privacy level associated with the application or entity. The privacy manager then evaluates one or more of the Master World and the Secondary World to find a node that has a corresponding privacy level. When a corresponding node is found, information at that particular granularity is provided to the requesting application or entity.

In another embodiment systems and methods of providing a location provider in the form of a location beacon are described. In this embodiment, a location beacon is provided that can be mounted in various areas (public/private areas) to beacon the location to any computing devices within transmission range. The information that is transmitted enables a device to determine its location or context. The location beacon can transmit information that is specific to the location service that uses the information. Transmitted information can include an EID/URL pair, and a LUID/URL pair. The EID gives the node identification of a node in the Master World; and, the associated URL gives a protocol to communicate with the Master World. The URL might, for instance, link to a server that can provide additional context information that uses the EID. The LUID indicates a node on a Secondary World that corresponds to a current location; and the URL gives a protocol to communicate with the Secondary World. For example, the URL can link with a server that is hosting the Secondary World. This server can then be queried to discover more information about the Secondary World (i.e. Secondary World tree structure, location of associated resources, etc.) With the EID and LUID (along with the URLs), a device can now traverse the Master World or Secondary World to determine its location. Various technologies can be used to implement the beacon (wireless, RF, IR). The beacon can be a "program once" device to deter tampering. Programmable beacons can, however, be provided. Security can also be provided in the form of a verifiable signature that is provided with the beacon information to assure the veracity of the transmitted information.

A useful context-aware computing aspect of the beacon is the concept of "location-enabled access". That is, in addition to (or separately from) receiving location information, a beacon can transmit code download pointers that enable smart devices to access software code that allows the device to participate in its current context.

Exemplary Computing System

In the context of this document, the term "computing device" is used to refer generally to any type of computing device. Characteristics of exemplary computing devices are that they typically include one or more processors, computer-readable media (such as storage devices and memory), and software executing on the one or more processors that cause the processors to implement a programmed functionality. In particular embodiments, implementation takes place in the context of mobile computing devices (e.g. laptop computers and the like), and/or hand-held computing devices (e.g. palm PCs, wireless telephones and the like).

FIG. 1 is a schematic diagram that constitutes but one example of a computing device that is suitable for use in connection with the described embodiments. It is to be understood that portions of the illustrated computing device can be incorporated in one or more of the computing devices (e.g. palm PCs, wireless telephones, etc.) with which particular embodiments are envisioned for use.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-Up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 1. The logical connections depicted in FIG. 1 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Defining the World

One of the problems to date with attempting to solve the context-aware computing problem is that every proposed solution has its own approach, data structures, processes and the like. There is little if any standardization between the various approaches. In the described embodiment, standardization is achieved at the foundational level by defining a universal view of the Earth. That is, a universally acceptable definition of the Earth is proposed and is useable in various computing scenarios to enable context-dependent computing. In this document, a specific example of context-dependent computing is given in the form of location dependent computing. It is to be understood that this constitutes but one example of a context in which the various embodiments discussed below can be employed. Other "contexts" can include, any information that can fit into a hierarchical structure including, without limitation, role/personnel in an organization, device categorizations, current activity, current environment, active devices and the like.

The Master World

A Master World is defined as a politically correct and publicly accepted hierarchical tree structure that catalogs physical location or geographic divisions of the Earth. The Master World is defined in such a way that many different classes of political, administrative and geographic entities across the entire Earth are included. Areas of political contention are accounted for by presenting a view of the world based on the language/locale of the computing device.

Figure 2:
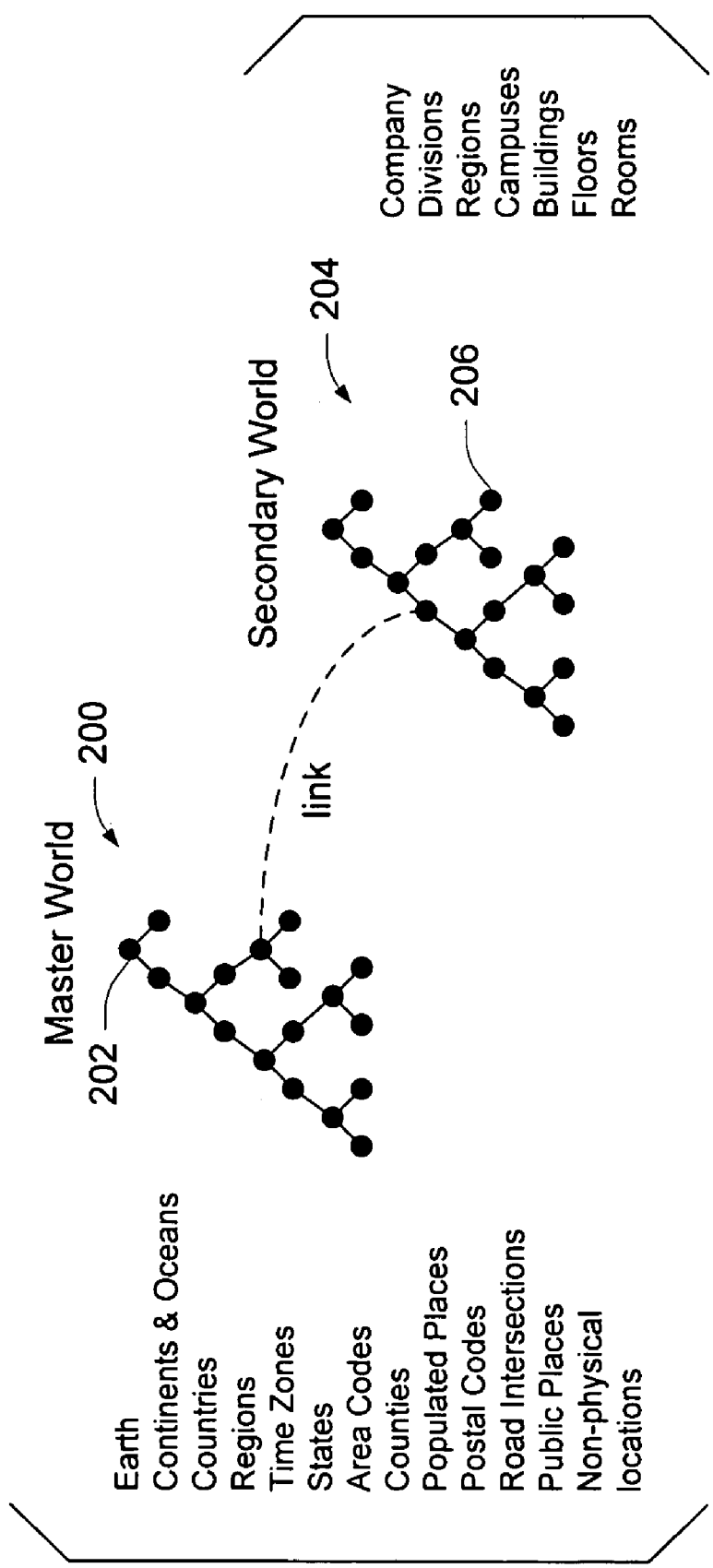
FIG. 2 is a conceptual diagram of an exemplary Master World and an exemplary Secondary World in accordance with the described embodiment.

FIG. 2 shows an exemplary hierarchical tree structure 200 that represents a portion of the Master World. The Master World contains multiple nodes 202, with each node representing some type of geographic division (e.g. political or natural entity) of the Earth. In the illustrated example, the nodes of the Master World are arranged in the following groups: (1) political or natural entities (e.g. continents, countries, oceans, states, counties, cities and the like); (2) infrastructure entities (e.g. postal codes, area codes, time zones and the like); (3) public place entities (e.g. parks, malls, airports, stadiums, and the like); and (4) non-physical entities (military postal code regions, vacation regions, affiliate coverage areas of television networks that can be geographically discontinuous, and the like).

In the FIG. 2 example, the top node of the tree structure represents the Earth. Each node underneath the top node represents a geographical division of the Earth. In this example, none of the nodes have an association with any businesses or services. That is, there is a distinction between node entities that are part of the Master World and non-geographic places where activities take place. Though the Master World includes nodes for public places (i.e. airports, malls, etc), it does not include individual listings of businesses or service providers. Each node is uniquely identified by an ID (EID or entity ID). In addition to the unique EIDs, a URL is associated with the tree structure and provides a context for the tree structure as will become apparent below.

As an example, consider the following: Seattle-Tacoma International Airport (SeaTac) will be included in the Master World, but references to individual airline business locations at SeaTac might be "leaves" on the tree that are tagged by the SeaTac Airport EID (see "Secondary World" section and the Table below). Similarly, the Seattle Center might be a node on the Master World, while the Seattle Arts Festival, Bumpershoot, the Seattle Sonics NBA Team, and the Seattle Center Starbucks Coffee Shop might be tagged with the Seattle Center EID. As another example, the Master World also contains nodes for all Interstate (motorway) exits. For example, the I-90, Exit 109, Washington is a node in the Master World. The Best Western Inn located at 1700 Canyon Road in Ellensburg, Wash. might be tagged with the EID of this Exit.

Thus, the Master World provides a uniform way of defining locations. The uniform location definitions can then be universally used to assign attributes to goods or services. Whenever a computing device determines its location to correspond to a particular uniform location definition, it can take advantage of the location-dependent goods or services that share the uniform location definition. The Master World is useful because it is a standardized view of the world. Its accurate standardized geographic dimension attribution can be easily accessed by both providers and consumers. Services and product providers (or third parties such as search engines, network and yellow-page database directories) can use the nodes of the Master World by assigning a standardized persistent geographic reference to all commerce locations or points of interest. These commerce locations or points of interest can be considered as "leaves" on the tree structure.

In the illustrated example, the nodes of the Master World have one or more attributes that facilitate its use. Exemplary attributes are described in the table immediately below:

| Attribute | Description |
| --- | --- |
| Entity ID (EID) | The EID is a unique ID for each node. No two nodes have the same EID. |
| Name | The name is defined in terms of the neutral ground truth (NGT) name. The NGT name supports various language translations for entity names as appropriate (e.g. Pacific Ocean, Pazifischer Ozean, Oceano Pacifico, etc.) |
| Geographical Entity Class (GEC) | The GEC is a geographical classification of each node. An exemplary GEC is discussed below in the "Geozone" section. |
| Latitude | The horizontal coordinate position on the globe (i.e. the coordinate position of the node's centroid) |
| Longitude | The vertical coordinate position on the globe (i.e. the coordinate position of the node's centroid) |
| Relative Importance | The geographic importance of an entity in reference to other entities in the same region. Value from 1 to 256 (e.g. New York City = 3, Los Angeles = 4, and Omaha = 5 even though Omaha is much smaller but almost as important in relation to surrounding populated places) |
| Contextual Parent(s) | The parents of the parent/child relationship for each node. Multiple parents are supported (e.g. Redmond is a child of King County, Area Code 425, the Pacific Time Zone, and the MSNBC affiliate KING TV). |
| Source | The source of origin for the record (e.g. Microsoft or a specified data vendor) |
| Start Date | Date when the node information was first valid |
| End Date | Date when the node information was last valid (retired zip codes, breakup of countries) |
| Modification Date | Records date changes that are made tot eh record relating to retirement or updates to any fields |
| Status | Active, lashed (links duplicate nodes together), pending or retired |

The attributes listed above constitute exemplary attributes only. Other attributes that are different from and/or additional to those referenced above could be used. A few exemplary entity or node records that employ the above attributes are shown below:

| | |
| --- | --- |
| Entity ID (EID) | 24948 |
| Name | Pacific Ocean, Pazifischer Ozean, Oceano Pacifico, etc. |

-continued

| | |
|---|---|
| Geographical Entity Class (GEC) | 138/Ocean |
| Latitude | 0 (+000° 00' 00") |
| Longitude | −170 (−170° 00' 00") |
| Relative Importance | 1 |
| Contextual Parent(s) | World |
| Source | MSFT GeoUnit |
| Start Date | 0/0/00 |
| End Date | 0/0/00 |
| Modification Date | 01/18/00 |
| Status | Active |

| | |
|---|---|
| Entity ID (EID) | 27490 |
| Name | Redmond |
| Geographical Entity Class (GEC) | 78/non-capital town |
| Latitude | 47.6768303 (+047° 40' 36") |
| Longitude | −122.1099625 (−122° 06' 35") |
| Relative Importance | 107 |
| Contextual Parent(s) | 1. King, second level [Washington, United States]<br>2. Puget Sound-Seattle, travel region [Washington, United States] |
| Source | MSFT GeoUnit |
| Start Date | 0/0/00 |
| End Date | 0/0/00 |
| Modification Date | 01/18/00 |
| Status | Active |

The Master World also serves as a repository of common denominator links between itself and various "Secondary Worlds" and as a conduit that connects Secondary Worlds to other Secondary Worlds. Content, service and device providers can use the Master World to associate their publicly available offerings with a geographic location and the corresponding multiple branch hierarchical structure. This location will be associated with a single entity within the tree structure thereby allowing geographic and time/distance calculations and the necessary parent/child relationship navigation.

The Master World Index (Geozones)

By definition, the Master World provides a hierarchical structure of entities (nodes) that cover the entire globe. Upward navigation within the hierarchy is quite natural. Efficient navigation downward requires geographic proximity awareness. Additionally, there are possible scenarios that will require jumping from branch to branch in order to successfully return values in a query, or for more accurate calculations of distances to close "leaves" attached to nodes other than the original source node. The Master World makes use of an index scheme that can identify peer level nodes by virtue of the geographical proximity. This indexing scheme makes use of a quad tree algorithm to define so-called "geozones."

A quadtree is essentially a spatial index that breaks coverage into homogeneous cells of regularly decreasing size. Each quadrant of the tree has up to four children. The quadtree segmentation process can continue until the entire map is partitioned based on many different end result criteria including the density of the number of items (e.g. points of interest) in each quad. The approach provides a form of spatial index that accelerates spatial selection and content identification.

To complete the spatial indexing scheme to provide each node with a defined geozone, a quadtree algorithm is applied to the nodes and can be based upon a desired density of, for example, points of interest that are to occur in any one zone. Once all of the zones have been defined, each zone is given a unique ID (e.g. top/left and bottom/right Latitude and Longitude pairs). Each of the nodes of the Master World is then assigned a zone in which it is located. Quadtree algorithms are known and will be appreciated by those of skill in the art.

The Master World Location

As can be appreciated, having a uniform standardized representation of the world in the form of a hierarchical traversable tree structure can greatly facilitate the manner to which context-dependent, and more specifically, location-dependent goods and services can be linked.

In the described embodiment, a computing device has access to at least a portion of the Master World. For example, the computing device can have the Master World saved in an internal storage device, it can comprise part of the computing device's operating system, or the device might access the Master World via a network medium such as the Internet. With the Master World tree structure being accessible to each computing device, each device has the power to determine its own context or node-referenced location. That is, the computing device can determine, through software it is executing, its particular location, i.e. node. Once the computing device determines an associated node, it can simply traverse the tree to ascertain its complete location.

For example, if a computing device determines that it is currently located at a node that corresponds to the City of Redmond, it can traverse the Master World tree structure to ascertain that it is in the State of Washington, Country of The United States, on the continent of North America. By ascertaining its precise location, the computing device (or its user) is now in a position to take advantage of location-dependent services that might be offered. This particular model is a tremendous improvement over current models that utilize a central server to ascertain location for a number of different devices. In that model, each device (or user) provides information about its location (e.g. perhaps the user enters the zip code or city that the device is currently in) and might enter a query to find, for example, a McDonald's restaurant in his zip code. The server then takes this information and might, for example, tell the user about the location of all of the McDonald's restaurants within that zip code or city. If the servers fails in this model, then none of the computing devices can take advantage of its services. In the present model, each computing device is self-sustaining. Each can determine its own location, and accordingly, each device can take advantage of location-dependent services. For example, if the computing device understands that it is located on a particular node of the Master World, then it can execute queries to find a McDonald's that has an EID that corresponds to the particular node in which the computing device is located. Particular robustness is provided through the use of the above-described geo-zones. The geo-zones enable proximate geographic divisions to be quickly searched in an efficient manner. For example, if an individual is looking for the nearest Kinko's to make copies and none are located in the geo-zone that corresponds to the node in which the computing device is located, then adjacent geo-zones can be quickly searched.

Secondary Worlds

In the described embodiment, the concept of a Secondary World is used to provide support for additional context. A secondary world might be defined by a third party organization or company and contains nodes that comprise physical and/or logical entities that are unique to that organization. The nodes of the Secondary World may or may not have much context outside of the particular organization that defined the Secondary World, since a secondary world could be made either public or private. The Secondary Worlds do not duplicate the Master World, but rather supplement it in a unique, organization specific manner. While the Master World is defined to be a widely accepted standard, each Secondary World can be a widely variant representation of an organization's proprietary view of the world. In the described embodiment, each Secondary World has at least one node that is linked with a node of the Master World. This gives the Secondary World a context or location in the Master World. Also note that in some context applications, several secondary worlds may be accessed, each providing additional context specific pieces of location data.

FIG. 2 shows an exemplary Secondary World 204 that comprises a plurality of nodes 206. Each of the nodes 206 constitutes a physical or logical entity. For example, the nodes can constitute a company, its divisions, regions campuses, buildings, floors in various buildings and rooms on various floors. At least one of the nodes is linked with a node of the Master World. The nodes of the Secondary World can have the same attributes as the nodes of the Master World.

As an example of a Secondary World, consider that Boeing might define a Secondary World that includes a list of entities that are important to its employees. The root entity would be "Boeing Corp." and its children might be company divisions (St. Louis Military Division, Everett Plant, Corporate HQ, etc.). Further down the tree structure, individual nodes might be defined to represent individual buildings (Hanger 12), offices within this building (Office 1001), building areas (Southwestern quadrant of hanger 12), etc. Each entity or node has a unique identifier (Local Unique ID or "LUID") and a URL that is associated with the tree on which the node occurs. The URL uniquely identifies the Secondary World tree structure so that a user within that world can determine how to interact with the world. This aspect is discussed below in more detail. Boeing can then use the LUIDs to associate equipment, services, departments or even personnel to a physical or logical location.

Figure 3:
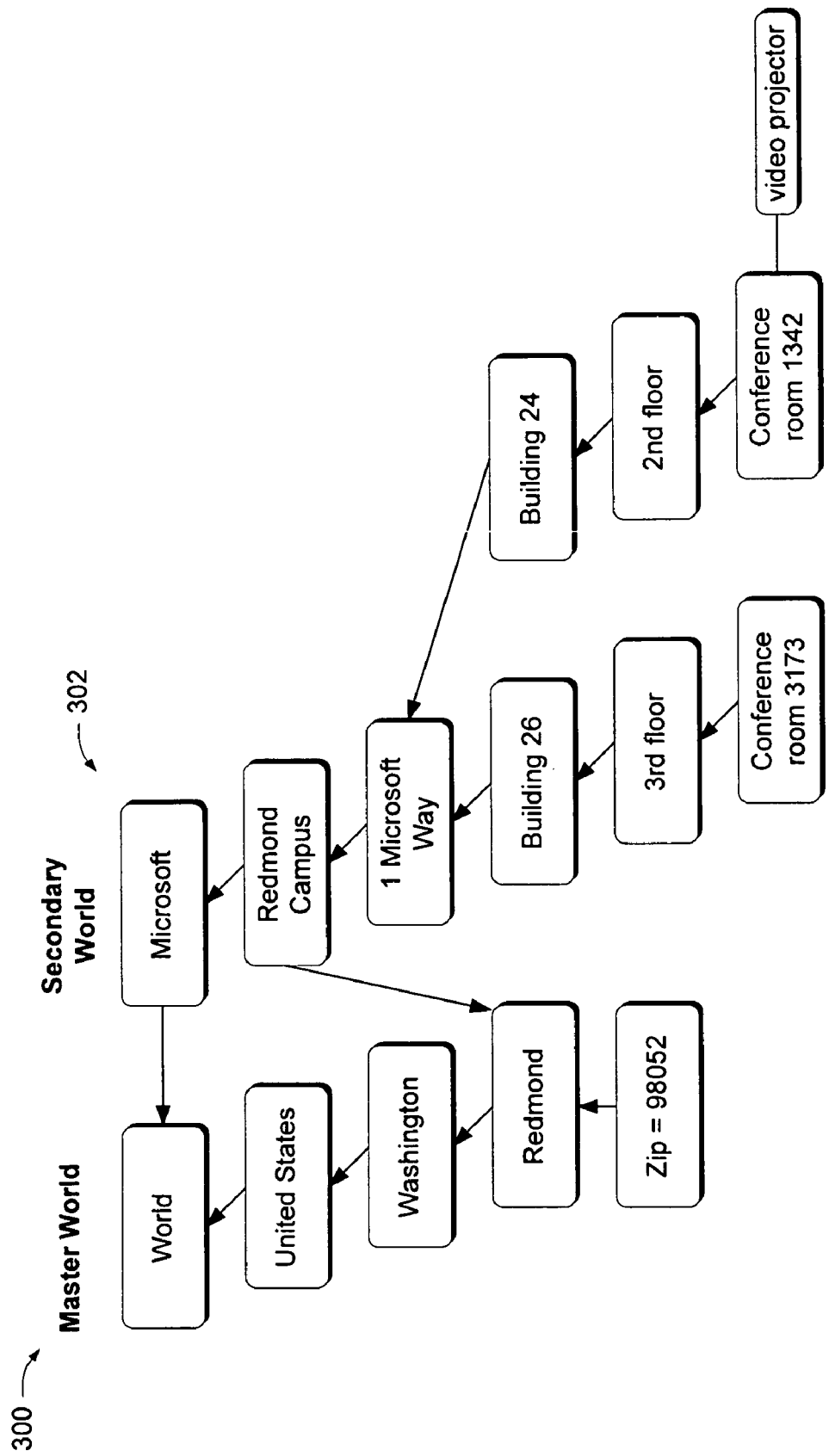
FIG. 3 is an exemplary specific view of a Master World and a Secondary World and their relation to one another.

As a more concrete example, consider FIG. 3 which shows an exemplary portion of the Master World 300 and a Secondary World 302. Master World 300 includes the following nodes: World, United States, Washington, Redmond, and Zip=98052. The exemplary Secondary World 302 is a hierarchical tree structure that has been defined by Microsoft Corporation and includes the following nodes: Microsoft, Redmond Campus, 1 Microsoft Way, Building 26, $3^{rd}$ floor, Conference Room 3173, Building 24, $2^{nd}$ floor, Conference Room 1342. In this example, the Secondary World 302 "touch points" into the Master World from the Redmond node. In this example, a video projector is shown as being associated with the node "Conference room 1342". Here, the video projector is not a node in the secondary world. Rather, the video projector is an item in some other resource discovery service (e.g. the active directory) and includes a location attribute that is a pointer to "Conference room 1342." There may be times, however, when nodes can be created in the worlds to represent the location of key services—the node themselves, however, would not represent the services.

Like the Master World, the Secondary World is advantageously accessible to a user's computing device. It could, for example, be downloaded—completely or partially—and stored on a storage device and accessed when needed. It might be downloaded for a one time use only. The Secondary World enables the computing device to ascertain its context within the Secondary World. In this example, the computing device would, by using the Secondary World, compute its location within the Secondary World. The computing device can do this by traversing the tree structure from the node in which it is currently located to the root node. This would, for example, give the computing device (and hence the user) a complete Secondary World context. Once the Secondary World location is known, the user is in a position to take advantage of goods or services that are associated with the nodes of the Secondary World. That is, once the computing device determines its Secondary World context, it is ready to become an active participant in the Secondary World.

Tremendous value can be achieved by associating goods or services with the individual nodes of the Secondary World. For example, Conference Room 1342 has a video projector associated with it. That is, the location of the video projector is in Conference Room 1342. Assume that an individual in Conference Room 3173 has a presentation that requires the use of the video projector such as the one located in Conference Room 1342. Normally, an individual would have no way of ascertaining the location of the video projector other than perhaps physically calling over to the building to check whether there is a video projector available. In this example, because the user's computing device is able to ascertain its location within the Secondary World, it is able to locate the video projector in Conference Room 1342. It would do this by simply executing software that traverses the Secondary World tree structure to find the resource of interest.

Note also that because there is a link into the Master World, the computing device is able to derive it context (location) within both worlds. This enables the computing device, and hence the user, to take advantage of goods and services that are associated with the Secondary World, as well as participate in location-dependent services that are consumable based upon the user's location in the Master World.

Figure 4:
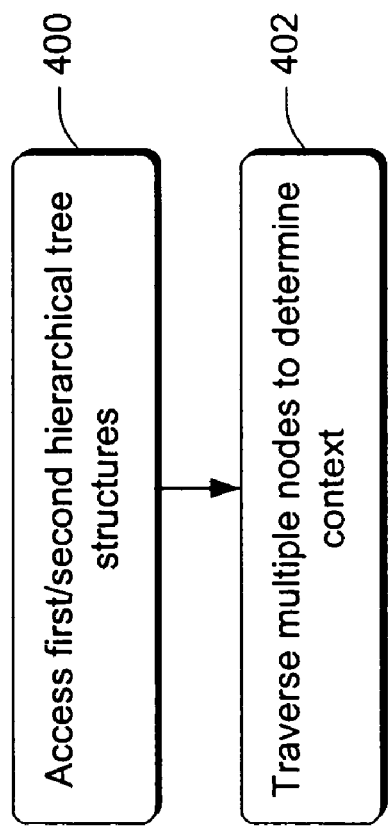
FIG. 4 is a flow diagram that describes steps in a method in accordance with the described embodiment.

FIG. 4 is a flow diagram that describes steps in a method in accordance with the described embodiment. The steps described just below are implemented by a computing device which, in the illustrated example, is a hand-held mobile computing device.

Step 400 accesses first and second hierarchical tree structures that are resident on a computer-readable media. In this example, the tree structures might be stored on the device or might be accessible via a network such as the Internet. An exemplary first tree structure is the Master World and an exemplary second tree structure is a Secondary World. Alternately, the tree structures could both be Secondary Worlds. Once the tree structures have been accessed by the device, step 402 traverses multiple nodes of the tree structures to derive the context of the computing device. In this example, the computing device receives information that informs it as to its location at a node of one of the trees. This information can come to the computing device in any suitable way, e.g. a user can enter the information through a User Interface (UI) or the location might be broadcast to the computing device by another computing device (e.g. through the use of Bluetooth technology or Universal Plug and Play (UpnP). Specific examples of how this information can be conveyed to the computing device are given below in more detail. Regardless of how this information is conveyed to the computing device, once the computing device has the information, it executes software that traverses one or both of the tree structures to derive its context which, in this example, is the device's location.

Defining Secondary Worlds

As was mentioned above, one particularly valuable aspect of the described embodiment is that individual organizations can define their own Secondary Worlds. This gives the organization a great deal of flexibility in providing goods and services and, more broadly, increasing the efficiency of their organization. In one embodiment, a software tool is provided that enables individual organizations to define and maintain their own Secondary Worlds.

In one embodiment, each secondary world can be uniquely identified as a name space (e.g. an XML namespace). This ensures that any overlap in names between the Secondary World and the Master World will not result in a collision. As an example, consider the following: the Master World might contain an entity identified as "Chicago" referring the city. A Secondary World that is established by the National Basketball Association (NBA) and a different Secondary World that is established by the Caterpillar Corporation might also have entities named "Chicago" that refer to completely different entities than the Master World's "Chicago." For example, the NBA's "Chicago" might refer to an NBA market area while Caterpillar's "Chicago" might refer to a sales district. Having the namespace separation between the Master and Secondary Worlds can ensure that there not a collision between identically named entities because each name space is uniquely different from every other namespace.

Figure 5:
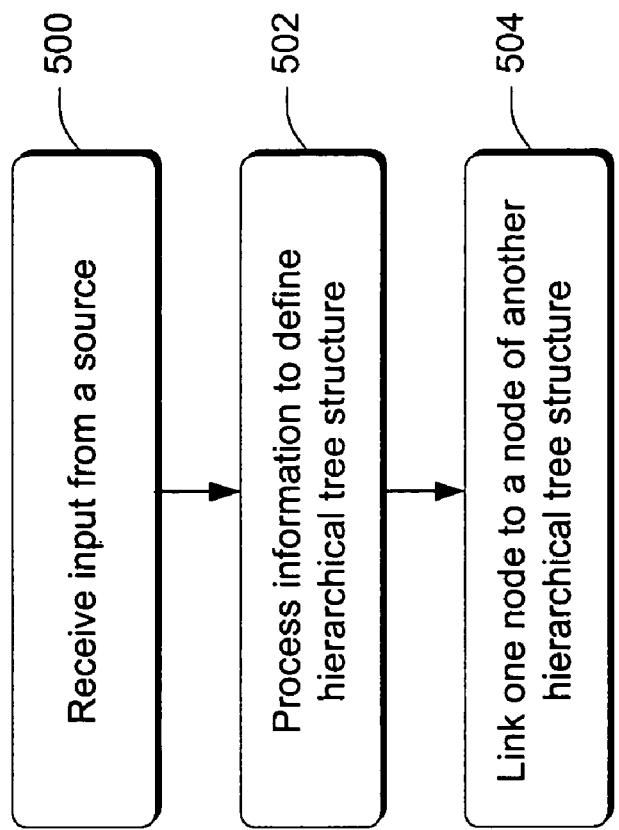
FIG. 5 is a flow diagram that describes steps in a method in accordance with the described embodiment.

FIG. 5 is a flow diagram that describes steps in a method of building a context-aware data structure. These steps are implemented by a software tool that is executing on a computing device.

Step 500 receives input from a source that specifies information that pertains to physical and/or logical entities. In this example, a system administrator might physically enter information about the structure of the Secondary World that they desire to define. This information can include information about buildings, divisions, conference rooms and the like. Step 502 then processes the information to define a hierarchical tree structure that has a context. In this example, the context is location. It will be appreciated, however, that other contexts could be employed. Each of the nodes in the hierarchical tree structure represents a separate physical or logical entity. Step 504 then links at least one of the nodes of the hierarchical tree structure with another tree structure having a context. In this example, this other tree structure can comprise the Master World. Once the tree structures have been built and linked, they are ready for traversal in a manner that enables context to be derived from one or more of the nodes.

Location as a Service

In the above examples, the computing device is able to determine its own location. In the embodiment about to be described, the computing device determines its location by using location information that is provided to it from a number of different sources of information. The device is able to take the information that is provided to it and process the information to determine a particular node on one or more hierarchical trees. Once the device has done this, it can determine its complete location which is a useful thing to know particularly when there are location-dependent services that can be consumed by the device's user.

Figure 6:
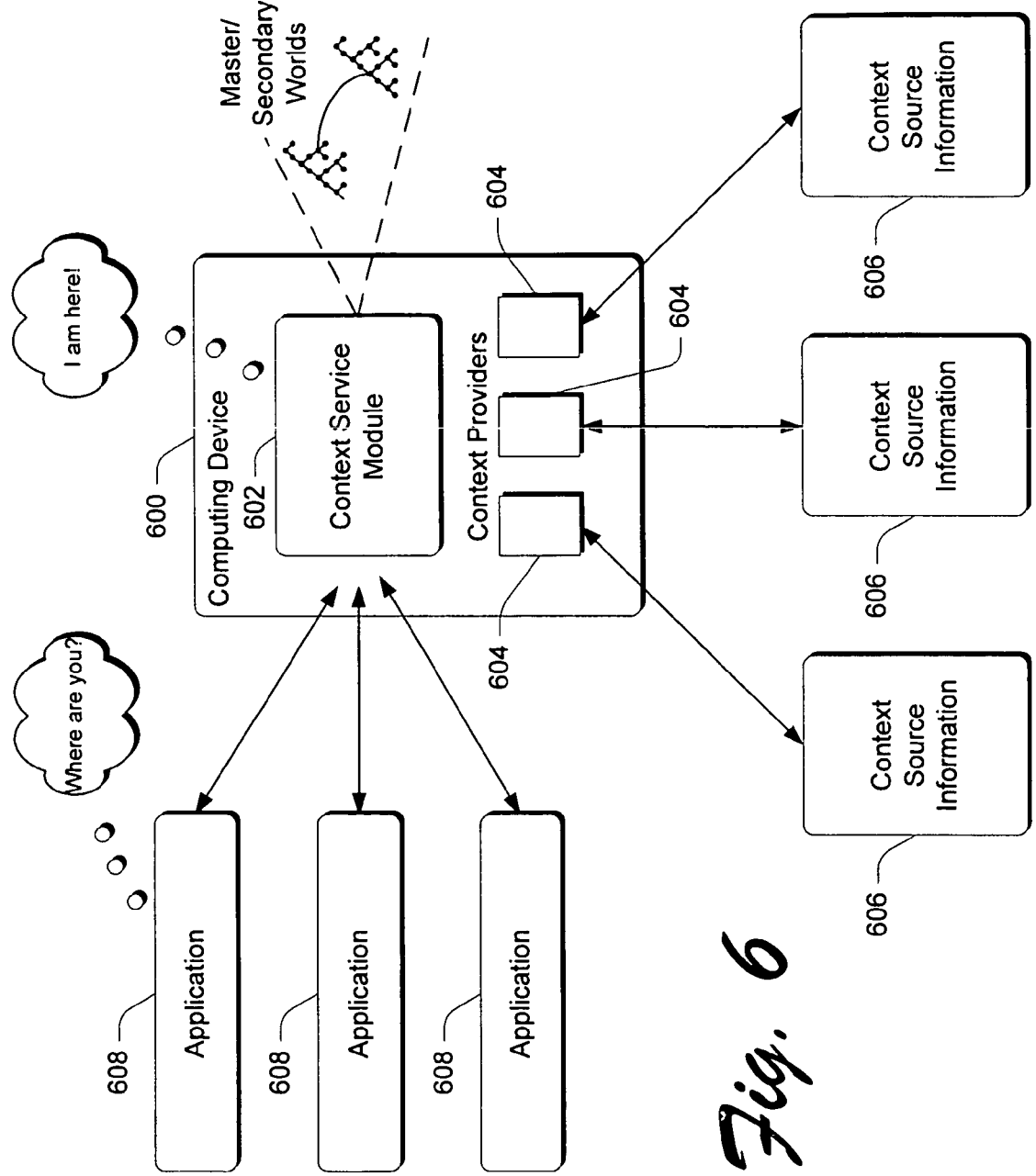
FIG. 6 is a high level diagram of an exemplary computing device architecture.

FIG. 6 shows a high level diagram of an exemplary computing device 600 that comprises, among other components, a context service module 602 and one or more context providers 604. The context service module 602 can be implemented in any suitable hardware, software, firmware or combination thereof. In this particular example, the context service module is implemented in software that is executed by one or more device processors. The context service module 602 receives context information from one or more context providers 604 and processes the information to determine a current device context. In this particular example, the device context is the device's location. Accordingly, the context providers are location providers that provide location information, in various forms, to the context service module 602 for processing. The location providers 604 receive information from various sources of context information (location information) 606.

In the context of this document, a context provider comprises a software component that can either be implemented on the device or off the device. The context provider can also include any suitable hardware, firmware or combination thereof. The role of the context providers are to receive information from sources 606 and convey the information to the context service module 602 so that the context service module can use the information to determine a current device context.

In the case where the context of the device is the device's location, sources 606 provide various information to the location providers 604 that pertains to the device's current location. As an example, the sources of the information can include various information transmitters such as a GPS system, cell phone or cell ID, wireless transmitters that transmit location information, location beacons, 802.11 transmitters and various other sources of information. The sources of information can also include other computing devices that might, for example, provide location information through Bluetooth technology. In addition, a source of information 606 might include a person who, for example, physically enters location information into the device 600 so that the device can process the information to determine its location.

When the device 600 receives the location information from the sources 606, it processes the information with the location providers 604 and provides the information to the location service module 602. The location service module 602 processes the location information and determines a particular node on one or more of the hierarchical tree structures to which it has access which corresponds to its current location. The location service module 602 can then traverse the tree structures to determine a complete location for the device. Once the complete location is determined, the device 600 can begin to interact with one or more applications 608 that can query the device about its particular location so that one or more location-dependent services can be rendered to the device. In this example, the applications 608 are illustrated as being separate from the device. It is to be understood, however, that the applications could be executing on the device, e.g. a browser application.

As shown, the applications 608 can make calls to the device to ask the device where it is located. The device is configured to receive the calls and respond in an appropriate manner to the application. Once the application has the device's location information, it can then render location specific services to the device.

Consider the Following Example: You are a traveler and have a hand-held mobile computing device that contains a Master World tree and a Secondary World tree for SeaTac International Airport. You are scheduled to depart on a plane for China from Concourse C. SeaTac International Airport has designed its Secondary World to have the following nodes: "Arrivals", "Departures", "Concourses", "Airlines", "Gates assigned to Airlines", and "Gate Location". When you arrive at the airport, as you enter the airport your computing device receives location information from different sources and with that information your device determines that your location is in the Arrivals node. SeaTac International has bank of servers that are executing applications to assist you while you are in the airport. There are applications that can help you find services, locate facilities (e.g. coffee shops, restaurants), give directions (e.g. how to get to your departure gate), update you on the status of your flight, and even check you in automatically for your flight. Consider also that as you walk through the airport your location changes. Your computing device, however, can receive continuous location information updates so that it can continue to determine its location as you move through the airport. At one point, as you pass a Starbucks coffee shop, your hand held device notifies you that if you purchase a latte at Starbucks and present your hand held device, you will receive a 50 cent discount on your latte. In this example, the utility of the Secondary World is demonstrated. By knowing where its particular customers are in its facility, SeaTac International is able to provide a host of services that were not possible before.

Assume further that you are in the airport and your flight is canceled. You must find a place to stay for the night. Accordingly, you wish to determine the closest Double Tree hotel because you really like the warm chocolate chip cookies they give you when you check in. You execute a search engine on your computing device to find the nearest Double Tree hotel. The search engine application first determines your current location in the Master World as indicated by the EID of the Master World node that corresponds to your location. Executing a search, the search engine application looks for a Double Tree hotel that has an attribute that includes an EID that matches your EID. If it finds one, it simply indicates for you the result. If it does not find one with the corresponding EID, it can use an adjacent geozone to search for a Double Tree hotel. It may also provide driving directions to the hotel. The search engine application was able to do this because it was able to ascertain your location in the Master World. It did this quickly and automatically with little or no effort from you.

Consider further that as you are driving from the airport to the hotel you decide that you want to find the nearest Kinko's so that you can print 100 copies of a presentation that you are to give in the morning. Consider that your hand-held computing device is a cellular phone and that Sprint is the carrier. Sprint has defined its own Secondary World that might, for example, be designated in terms of cell nets. By virtue of having Sprint's Secondary World on your computing device, you are able to ascertain your location in Sprint's Secondary World and, accordingly, your location in the Master World. Consider that Kinko's also has a Secondary World that links with the Master World. By executing a search application on your device, you are able to ascertain the location of the nearest Kinko's as well as driving directions thereto. All of this is possible because your device has access to the Master World and one or more Secondary Worlds. In this example, the Master World provides a mechanism to daisy chain two or more Secondary Worlds together. This is possible because the Secondary Worlds have at least one reference or link into the Master World.

Exemplary Device Architecture

Figure 7:
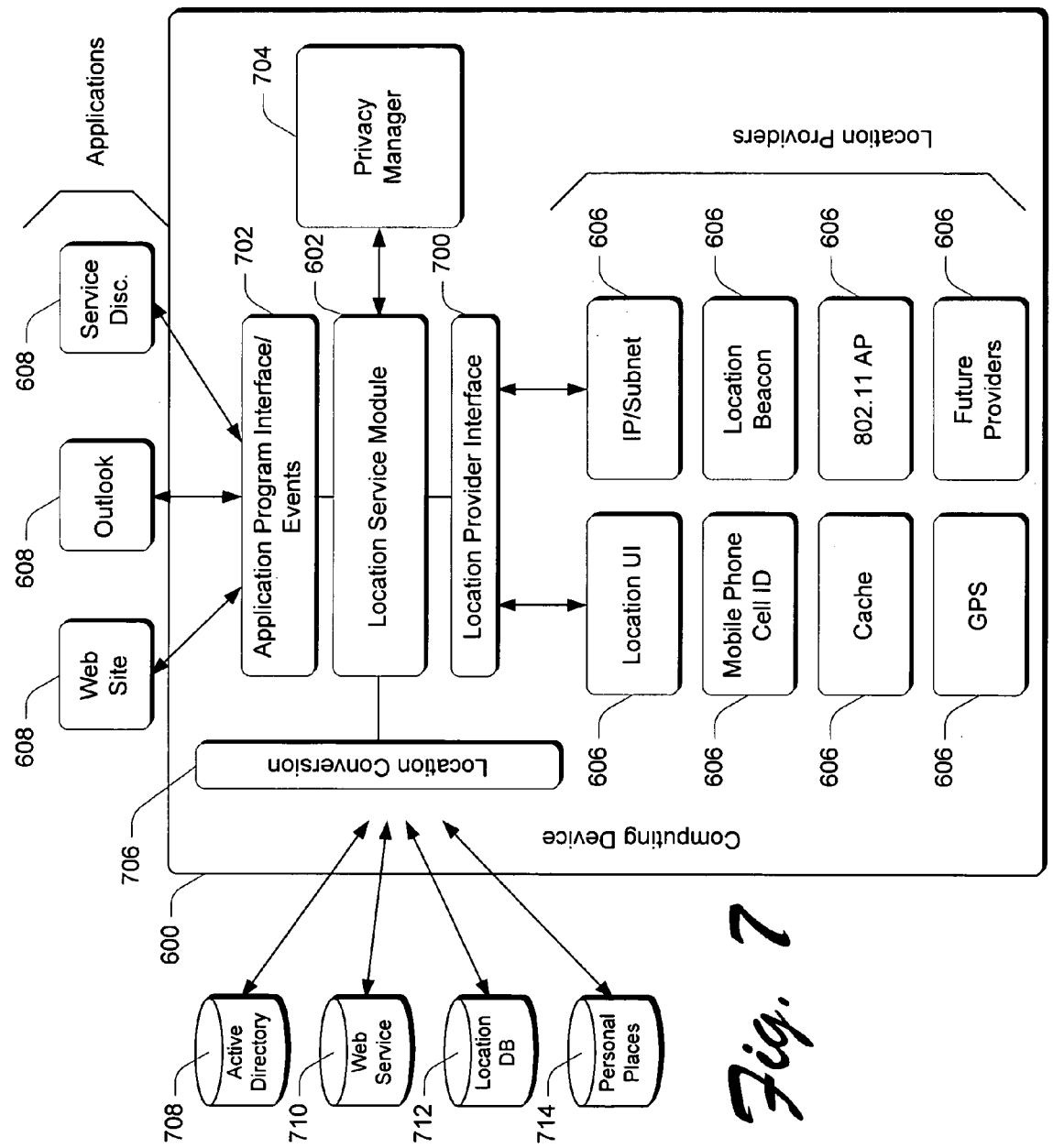
FIG. 7 is a somewhat more specific view of an exemplary computing device architecture.

FIG. 7 shows computing device 600 in somewhat more detail. In this particular embodiment, device 600 comprises an architecture that includes the following components: a location service module 602, a location provider interface 700, an application program interface (API)/Events module 700, a privacy manager 704 a location conversion module 706, one or more applications 608 and one or more location providers 606. Also included in the architecture is an active directory 708, Web service 710, location database 712, and personal places 714. The architecture can be implemented in any suitable hardware, software, firmware or combination thereof. The architecture mentioned above is advantageous in that it enables each computing device to determine its own context or location.

Common Location Provider Interface

One particularly advantageous aspect of the described embodiment is that it employs a common interface 700 that provides a standard interface through which the location providers 606 communicate. By having a common interface, the location providers are extensible (to support future providers) in that they can be dynamically added or removed from the collection of location providers. All that is required of a particular location provider 606 is that it be written to support the common interface.

In this example, there are several location providers 606. These location providers provide location information in different forms. For example, a GPS location provider might provide location information that is GPS specific. Similarly, an IP/Subnet location provider might provide information that is specific to an Internet Protocol. A mobile phone location provider might provide location information in the form of a cell ID. In addition, a location User Interface (UI) might provide location information in the form of a user entry that specifies a city, street or building. All of the location information that is provided by the various location providers is processed by the location service module 602 SO that a current device location can be determined. To determine the current device location, the location service module 602 may have to consult with an active directory 708, a Web service 710, or a location database 712. In the illustrated example, the active directory 708 might, for example, maintain a secondary world and other networking metadata such as subnet and "site" information that can help determine location based on networking connectivity. Web service 710 can hold the master or secondary worlds, the attributes of which can be used to find location. For example, if a cell phone knows its cell tower ID, then the location provider can query the secondary world to ascertain the nodes that match that cell tower ID. Location database 712 is basically a version of the web service that is hosted or cached locally.

Location Providers

As indicate above, the architecture contemplates multiple different location providers that can provide location information to the location service module 602. This information can come in many different forms and quality levels. The information is then processed by the location service module 602 to determine a current device location. To do this, the service module 602 ascertains from the location information a particular node ID (EID and/or LUID) and a URL that is associated with the tree structure with which the node is associated. Once the location service module ascertains a node ID, it can then query the tree structure (or more accurately a server that manages the tree structure) using the URL to ascertain more information about the tree structure. For example, if the location service module 602 ascertains a LUID from a particular Secondary World, it might then query an active directory 708 (or an Intranet server—which is another location database) to discover the parents and the children of the node. This would then enable the location service module to build the Secondary World.

The location providers 606 can provide the location information to the location service module 602 in many different ways. For example, some location providers 606 may continuously provide information (e.g. the GPS provider may continuously provide GPS coordinates). Alternately, the location providers can periodically provide location information such as at specific times or on the occurrence of definable events. For example, a user may define specific times when the location information should be updated. Alternately, the location information might be updated only when a device's location changes (i.e. a location change event). Additionally, the location providers might provide location information when polled by the location service module 602. For example, the location service module 602 can call the location provider interface 700 and request location information from one or more of the location providers.

One specific location provider 606 is shown as a cache. The cache provider essentially maintains a current device context or location. That is, once the location service module 602 has ascertained its current location, it writes this location to a cache. This enables the device 600 to ascertain its location with a degree of confidence in the event all of the other location providers are not able to provide location information (e.g. the GPS provider may not receive GPS information because the GPS transmitter that supplies it with the information is unable to contact a requisite number of satellites).

Confidence and Accuracy Parameters

One important and useful feature of the described embodiment is that one or more of the location providers are configured to assign confidence parameters and/or accuracy parameters to the information that they provide to the location service module 602. Confidence parameters provide a measure of a provider's confidence in the information that it provides to the location service module 602. For example, assume that a GPS transmitter must receive information from five or more satellites in order to provide highly confident information. Assume that only three satellites are available at the time. The GPS transmitter would then transmit its information based only on the three satellites. The GPS provider would then know that the information it receives from the GPS transmitter was based only on three satellites rather than the desired five or more. In this case, the GPS provider can set a confidence parameter on the location information that indicates that it has a lower confidence level than if the information were based on the desired five or more satellites. In this case, the location service module 602 can take the confidence parameters for all of the location providers into account when determining the location of the device. This is discussed in more detail below.

With respect to the accuracy parameters, consider that the location information that is received from the location providers is accurate to varying degrees. Some information may be accurate to within one mile, while other information may be accurate to within 100 feet. The location providers are desirably configured to assign accuracy parameters to the location information that they provide to the location service module 602. The accuracy parameters give the location service module an indication of the accuracy of the information.

When the confidence and accuracy parameters are used by the location service module 602, the module can make decisions on how to use the location information it receives from each provider. For example, the location service module 602 might disregard completely any information that has a low confidence parameter. It might, on the other hand, strike a balance between the accuracy of the information and its confidence. For example, the module 602 might be programmed to use information with lower levels of accuracy only when there is a high level of confidence in the information. The module 602 might utilize the parameters to assign weights to the information so that the location is calculated as a weighted function of the confidence and accuracy of the information.

Another use of the confidence parameters is as follows: Assume that the location service module has determined a device location and has written that location to a cache. At the time when the location is written to a cache, it is assigned perhaps a high confidence level. Assume further that all of the other location providers are unavailable to provide location information. For a period of time, the location service module 602 can use the cache location as a current location and be fairly confident that its information is generally accurate. In this case, the location service module might assign a linearly decreasing confidence level to the information over time so that at some point, it ceases to use the information or informs the user that the information cannot be guaranteed.

Location, Trust, and Timestamp

When the location providers provide their information to the location service module 602, the information can include, in addition to the confidence and accuracy parameters, the actual location information in a known format, a trust parameter and a timestamp. The trust parameter is a metric that is assigned by the location service module 602 to one or more of the location providers and defines the trust that the location service module has for the particular location provider. The timestamp is a metric that defines the time when the location information was provided by the location provider. This assists the location service module 602 in ascertaining whether information is stale and might need refreshed.

Once the location service module 602 has all of the location information, it can then set about determining the location of the device.

Figure 8:
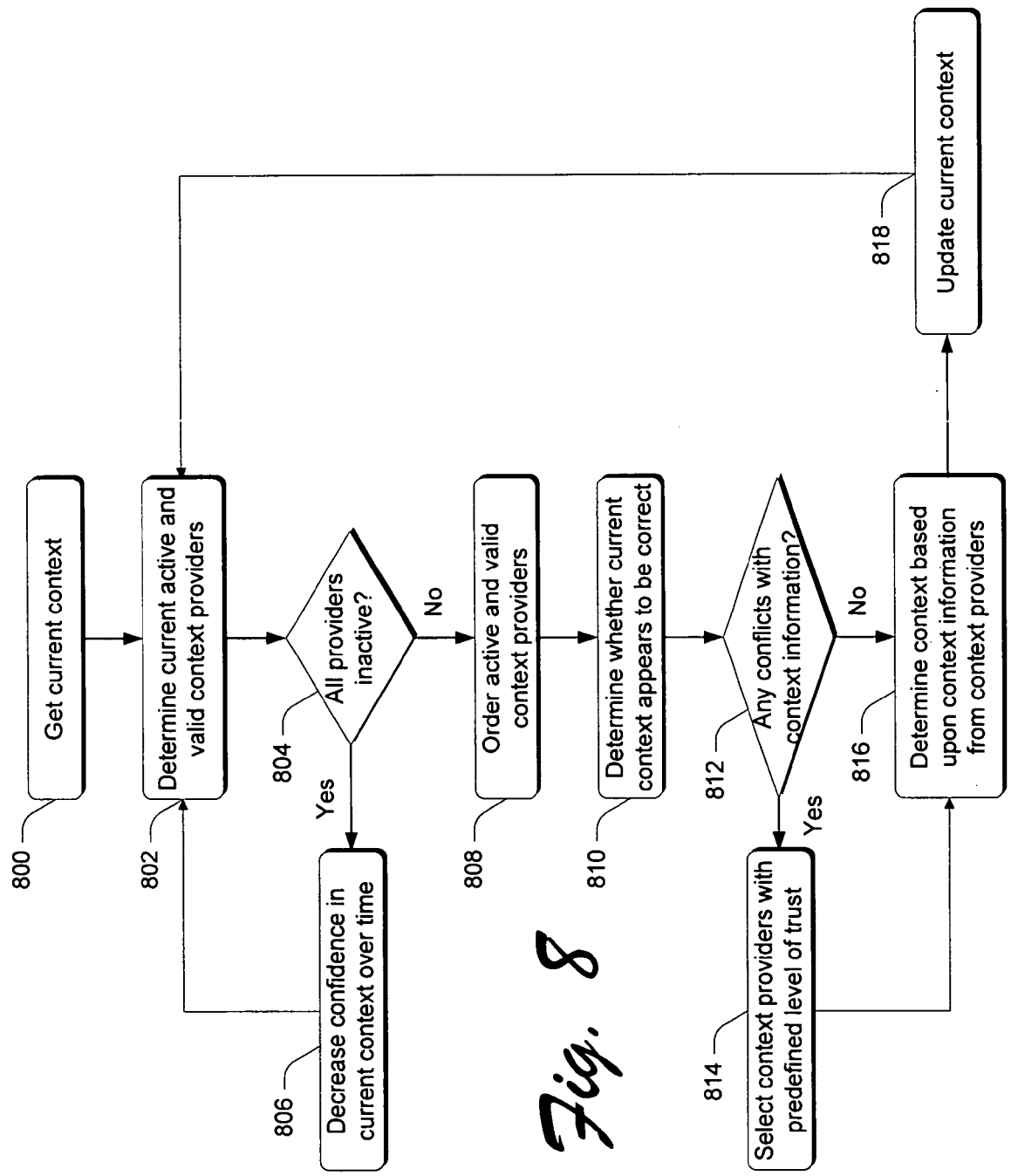
FIG. 8 is a flow diagram that describes steps in a method in accordance with the described embodiment.

FIG. 8 is a flow diagram that describes steps in a method of determining a device context which, in this example, is the device location. These steps are implemented by the location service module 602.

Step 800 gets the current device context. The current context can be the last calculated device context that is stored in the cache. Step 802 determines whether any of a number of context providers are available to provide context information. The location service module might do this by polling the context providers to ascertain which of the providers are active and valid. Step 804 determines whether all of the providers are inactive. If all of the providers are inactive, step 806 decreases the confidence in the current context over time and uses the current context as the device context. Step 802 then continues to monitor for current active and valid providers. If step 804 determines that one or more of the context providers are active, then step 808 orders the active and valid context providers. When the location service module 602 orders or sorts the context providers, it does so as a function of the confidence of the provider's information and/or the trust that the location service module has in the location provider. This provides a ranked list of the location providers. Step 810 checks to ascertain whether the context information appears to be correct. For example, where the context is the location of the device, the location service module 602 might know that five seconds ago the current location was Redmond, Wash. Accordingly, location information that indicates that the current location is Beijing, China would be incorrect. Step 812 then determines whether any of the context information conflicts with either the device's current context or the context information from other providers. For example, the location service module 602 can compare the context information from each of the context providers with the information in the cache. If any of the information conflicts with the cached information, then the information from that context provider can be discarded. Similarly, if context information varies inordinately as between the context providers, then step 814 can select the context providers having a predefined level of trust and perhaps use just their information (Step 816). If there are no conflicts, then step 816 determines the current context based upon the information that is provided by all of the context providers. In the described embodiment, this step is implemented by using the information to map to a particular node in one or more of the hierarchical tree structures mentioned above. For example, the location of the device can be ascertained by mapping the information to a particular node, and then completely traversing the tree structure until the root node is reached. Step 818 then updates the current context by perhaps writing it to the cache and returns to step 802 to determine the active and valid context providers.

The method described above provides a way for the location service module to receive location information and use only the location information that appears mostly likely to represent a current location. Conflicting information can be discounted or disregarded thereby assuring that only the most trusted, accurate and confident information is utilized to determine the device's current location.

Self Monitoring

In addition to the confidence and accuracy parameters, one or more of the location providers are advantageously programmed to self monitor their own operation for various irregularities that can occur. On the occurrence of an irregularity, the location providers are configured to notify the location service module 602. For example, the source from which the location provider receives its information may go off line for a period of time so that the location provider is unable to receive any additional information. In this case, the location provider might generate a "provider out" message and send it to the location service module 602. When the location service module 602 receives the "provider out" message, it can then take steps to exclude the location information from that provider from any location calculations that it performs. When the location provider's source comes back on line, it can generate a "provider on" message that informs the location service module 602 that it is able to transmit location information to the module. Of course, the location service module can be notified by the location providers on the occurrence of other operational irregularities, with the above example constituting but one specific case.

Applications

Once the location service module 602 has determined the device's location, it can receive queries from one or more applications 608. In the FIG. 7 example, the applications include a web site application, an Outlook application, and a service discovery application. In the present example, the web site application can be any web site application that is capable of rendering location-specific services. For example, the user of the device 602 might access Amazon.com's web site to buy a favorite book. When the user purchases their book, Amazon.com must now compute the taxes that the user must pay. In this example, a script executing on Amazon.com's web site might query device 602 to learn of the user's location. In this particular example, the device might respond to the query by returning the state in which the user is making the purchase. Amazon.com can then assess the tax automatically. Amazon.com might also desire to know where the individual is located so that they can select an optimal shipping method (UPS or Express Mail). Depending on where the individual is located, one method may be preferred over the other. The Outlook application might query the location service module to ascertain the location because it (or the operating system, e.g. Windows) may change device settings based on the location of the computing device. For example, the user may print on one particular printer while at work, and another particular printer when at home. When the Outlook application determines that the user has gone home for the day, it can automatically change the device settings for the printer at the user's home. It might acquire the print settings from a personal places data store 714. Thus, the device is automatically configured for use depending on the user's location. The service discovery application might query the device to determine its location so that it can render a particular service depending on where the device is located. For example, if the user asks the application to locate the nearest color printer, the service discovery application might query the location service module to ascertain the device's current location so that it can use this information and find the nearest color printer. Consider also that the Outlook application could configure itself email to a work location (when an individual is at work) or to a home location (when an individual is at home). In addition, the Outlook calendar can become location aware, e.g. when you change time zones, your appointments would show up in the proper time slots.

As one can imagine, the possibilities are seemingly endless. This functionality is made possible through the use of the Master World and one or more Secondary Worlds.

Application Program Interface/Events

In the described embodiment, the applications 608 communicate with the location service module 602 through one or more application program interfaces (APIs) and/or events. The applications can make function calls on the API to query the location service module as to its current location. Similarly, the applications can register for location notifications by using an events registration process. For example, an application may register for a notification when the user changes their location. Consider the case where an application requests to be notified when the user arrives at work or at home so that the application can change the device's configuration (such as printer configuration).

Figure 9:
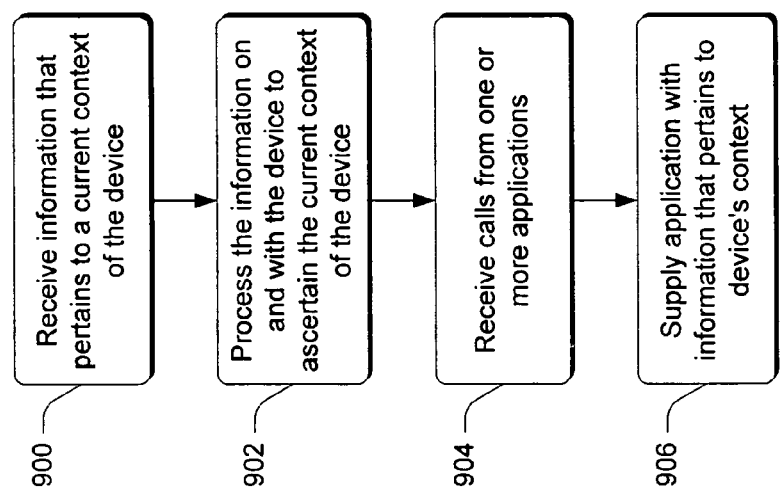
FIG. 9 is a flow diagram that describes steps in a method in accordance with the described embodiment.

FIG. 9 is a flow diagram that describes steps in a method in accordance with the described embodiment. The steps that are described are implemented by device 600. Step 900 receives information that pertains to the current context of the device. In this particular example, a portion of the information is received from one or more context providers which, in this case, are location providers. Step 902 processes the information on and with the device to ascertain the current context of the device. In the illustrated example, the device maintains (or has access to) one or more of the Master World and one or more Secondary Worlds. When the device receives all of the location information, it maps the information to a particular node in the hierarchical tree structure that defines the Worlds. It then traverses the tree structures to ascertain the complete context (i.e. location) of the device. Step 904 receives calls from one or more applications that request information that pertains to the device's current context or location. In the illustrated example, the applications can call one or more APIs to request the information or the applications can register for event notifications. Step 906 then supplies the applications with at least some information that pertains to the current device location. As will be discussed below, a security policy or privacy policy can be applied to the information before it is returned to the applications.

Privacy Manager

In one embodiment, a privacy manager 704 (FIG. 7) is provided. Although the privacy manager is illustrated as being incorporated on the device, it could be implemented by a trusted entity such as a trusted server that is not part of the mobile computing device. The privacy manager can be implemented in any suitable hardware, software, firmware or combination thereof. In the illustrated example, the privacy manager comprises a software module that is incorporated in the mobile computing device.

The privacy manager 704 addresses privacy concerns that are associated with the information that is collected by the computing device. Specifically, the location service module can calculate detailed information regarding the location of the computing device. It may be desirable, in some instances, to filter the information that is provided to various applications. That is, it is entirely likely that a user may not want their specific location information provided to untrusted applications. In these instances a user might just desire for location service module 602 to inform such applications that the user is in the State of Washington.

Figure 10:
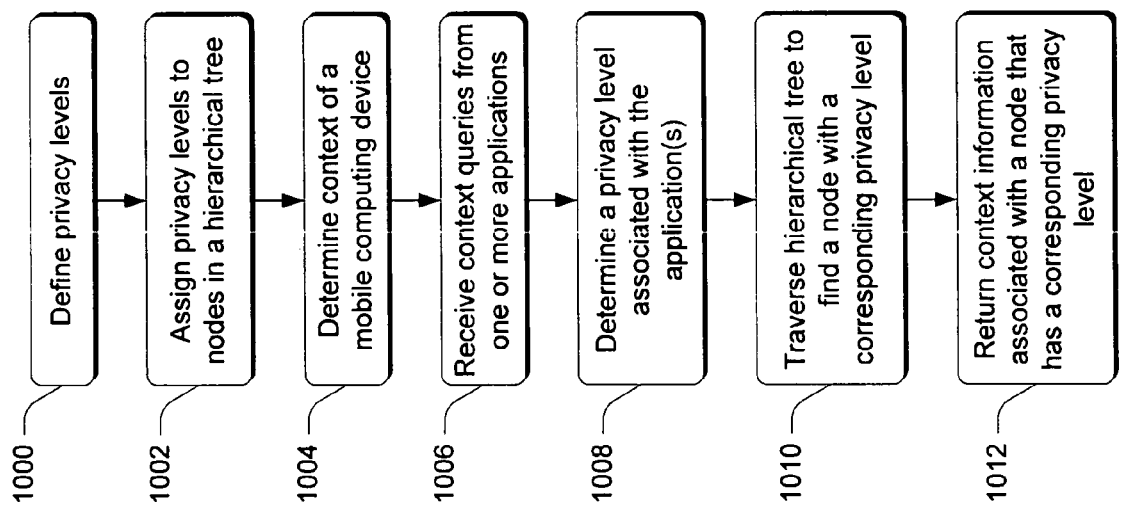
FIG. 10 is a flow diagram that describes steps in a method in accordance with the described embodiment.

FIG. 10 shows a flow diagram that describes steps in a privacy protection method in accordance with the described embodiment. These steps can be implemented by the privacy manager 704.

Step 1000 defines a plurality of privacy levels. Exemplary privacy levels are set forth in the table immediately below:

| Privacy Level | Approximate Scale | Level of Revelation |
| --- | --- | --- |
| 0 | — | No location information is returned |
| 10 | 100,000 Km | Planet/Continent |
| 20 | 1,000 Km | Country |
| 30 | 100 Km | State |
| 40 | 10–100 Km | City & County or Region |
| 50 | 10 Km | Postal Code & Phone Area Code |
| 60 | 1 Km | Full Postal Code (Zip + 4) & Area Code and Exchange |
| 70 | 100 m | Phone Number & Building/Floor |
| 80 | 10 m | Room # |
| 90 | 1 m | Exact Coordinates |

In the illustrated table, 10 different privacy levels are defined and each has an associated approximate scale. For example, a privacy level of 0 means that no location information is returned. A privacy level of 90 means that very detailed location information is returned.

Step 1002 assigns various privacy levels to the individual nodes in one or more hierarchical tree structures. For example, each node of the Master World and the Secondary Worlds can have a privacy level associated with it. The root node of the Master World tree structure might have a privacy level of 10, while the node that represents a current location in a Secondary World might have a privacy level of 90. Step 1004 determines the context of the computing device. In the present example, the context is the device location and examples of how this is done are given above. Individual applications that call the location service module can have privacy levels associated with them. These privacy levels can be assigned by individual users. For example, a trusted application might have a privacy level of 90, while an untrusted application might have a privacy level of 30. Step 1006 receives context queries from one or more applications. Here, an application calls the location service module 602 (FIG. 7) to ascertain the location of the device. Step 1008 determines the privacy level associated with the application or applications. For example, if a untrusted application calls to request location information, the privacy manager 704 would determine that the application has a privacy level of 30. The privacy manager then traverses (step 1010) one or more hierarchical tree structures to find a node with a corresponding privacy level so that it can select the information that is associated with that node. In this example, the traversal might involve jumping from the Secondary World to the Master World to find the node that corresponds to the state in which the user is located. Once the corresponding node is found, step 1012 returns the context information (e.g. location information) associated with the node. In this case, the location service module would inform the application that the user's location is the State of Washington.

As an example, consider the following: There is a web site that gives up to the minute weather of various locations. Accordingly, you might assign this web site a privacy level of 60 so that you can receive weather information for the geographical area that corresponds to your present full postal code. Another web site might be a corporation intranet web site that is a trusted web site. Thus, any applications associated with this web site can be assigned a privacy level of 90 so that you can give them precise location information as to your whereabouts.

Thus, in the present example, the computing device is able to determine the source (i.e. application) of its queries and modulate the information that is returned to the application as a function of the application's identity. The computing device is able to do this because it has access to the Master World and one or more Secondary Worlds. The above description constitutes but one exemplary way of accomplishing this feat.

Location Beacons as a Location Provider

In one embodiment, one of the location providers comprises a location beacon that beacons or transmits information to enable a computing device to actively participate in its current context. Location beacons can comprise standalone devices that can be retrofitted onto existing infrastructures, e.g. a smoke detector or wall outlet in order for the device to have a power source.

Figure 11:
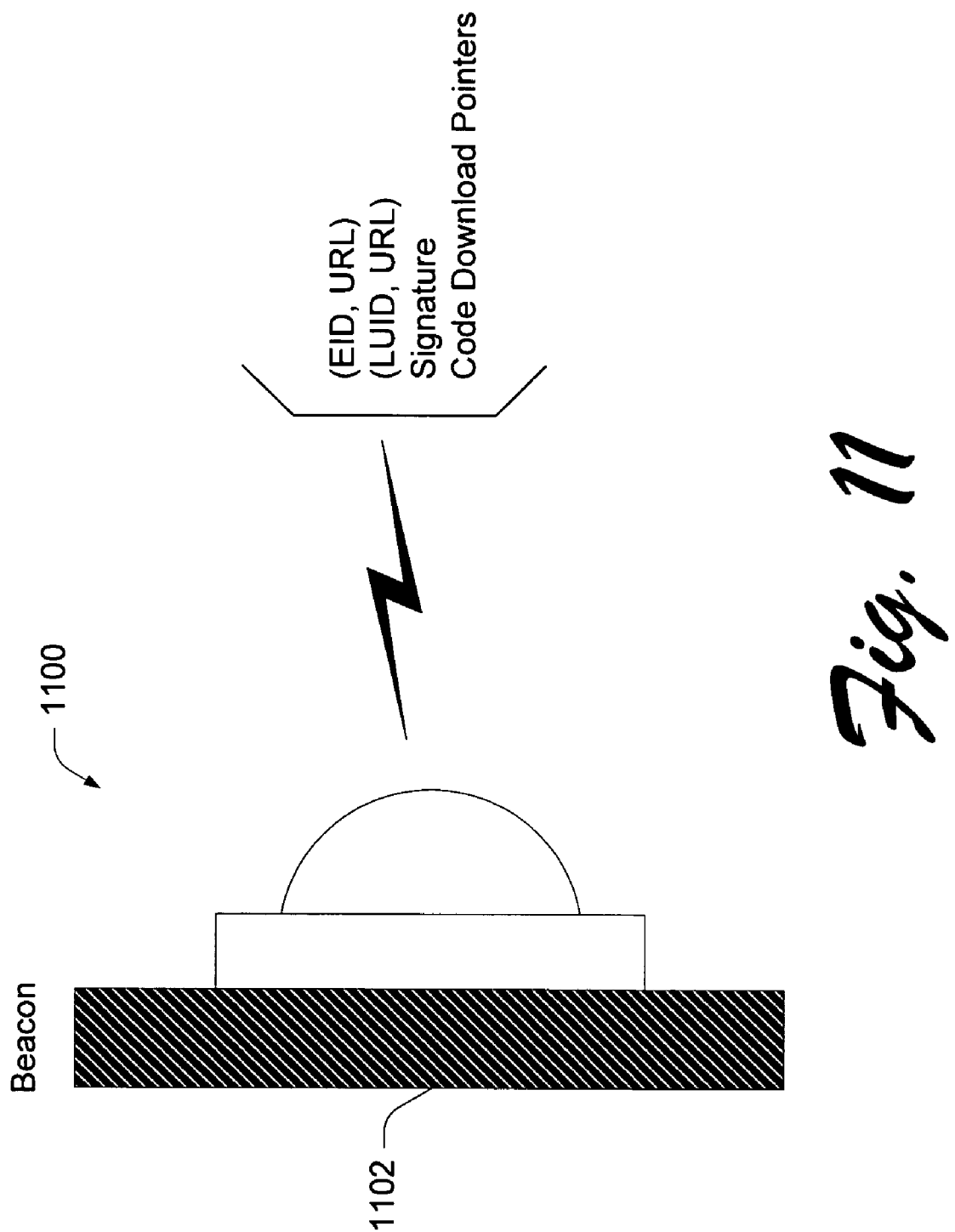
FIG. 11 is a side elevational view of an exemplary location beacon in accordance with one embodiment.

FIG. 11 shows an exemplary beacon 1100 that is mounted on a structure 1102. Structure 1102 can be any suitable structure such as a wall in a conference room or public place, a smoke detector, an electrical socket and the like. In the described embodiment, the location beacons are small inexpensive devices that can be permanently mounted in special locations such as conference rooms, building lobbies, airport gates, public places and the like. The beacons announce the physical location in the form of an EID and/or LUID to all mobile devices that are within range, such as laptops, tablet PCs, hand held computers, mobile phones, wearable computers and the like.

In the described embodiment, the location beacon can identify the particular locations by beaconing standard information that will be understood by the mobile computing devices. In the present example, the beacons can transmit one or two location identifier pairs comprising an EID/URL pair and a LUID/URL pair. The beacon might also transmit multiple LUIDs. The EID and LUID give the present node location in the Master World and Secondary World respectively. The URLs provide a reachable location for the Master and Secondary Worlds. For example, the URL associated with the Secondary World can give a service location that the device can use to query information about the Secondary World so that it can derive its context and take advantage of resources or services that are associated with the nodes in the Secondary World.

The beacons can also transmit a digital signature that can be used by the device to ascertain that the beacon is valid and legitimate. Any suitable signature or verification method could be used. In addition, and of particular use in the context-aware environment, the beacon can be programmed to transmit code download pointers to devices within range. The code download pointers can enable the computing device to access software code that permits them to interact with their environment. Consider the following example: You walk into a conference room with your cell phone computing device and immediately a beacon in the conference room transmits your location in the form of an EID/URL pair and a LUID/URL pair. Your device uses the information pairs to ascertain its location in the Master and Secondary Worlds as described above. The beacon also transmits a code download pointer that points to software code that enables you to operate the video projector in the conference room using your hand-held cellular phone. In this manner, the beacon serves as more than just a location beacon—it permits you, through your computing device, to actively participate in your surroundings.

The beacons can transmit the information in any suitable way, e.g. wireless methods including infrared and radio frequencies. In one embodiment, Bluetooth short range radio frequency communication can be used to provide a low cost, low power alternative.

Cell Phone Embodiment

Within the past several years, cell phones have become a very important communication device. Their prevalence has helped people communicate with one another from seemingly anywhere and at anytime. Today, cell phone functionality permits one to check and send e-mail, browse the Web, send/receive short messages (SMS), leave voice messages and, of course, talk.

Today, however, cell phones are not aware of their context and in particular, their location. Using the inventive systems, structures and methods described above, cell phones can be imparted with context awareness and location awareness in a way never before experienced. This, in turn, leads to an enhanced user experience. It is to be appreciated and understood that the techniques described above constitute but one way of enabling a cell phone to determine its context and/or location. Other techniques can, of course, be used without departing from the spirit of the claimed subject matter. That is to say, any suitable way, technique, or method can be used to provide a cell phone with, or otherwise enable a cell phone to determine its current context or location.

Figure 12:
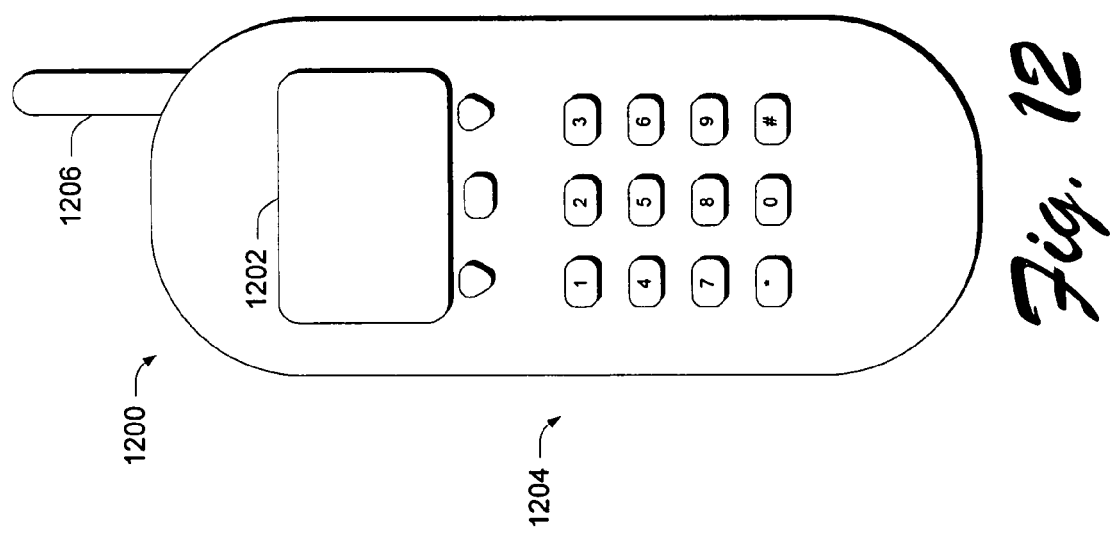
FIG. 12 is a front elevational view of an exemplary cellular phone.

FIG. 12 shows an exemplary cell phone 1200 that includes a display area 1202, various buttons 1204 that permit a user to interact with the cell phone, and an antenna 1206 for facilitating communication between the cell phone and the outside world.

Figure 13:
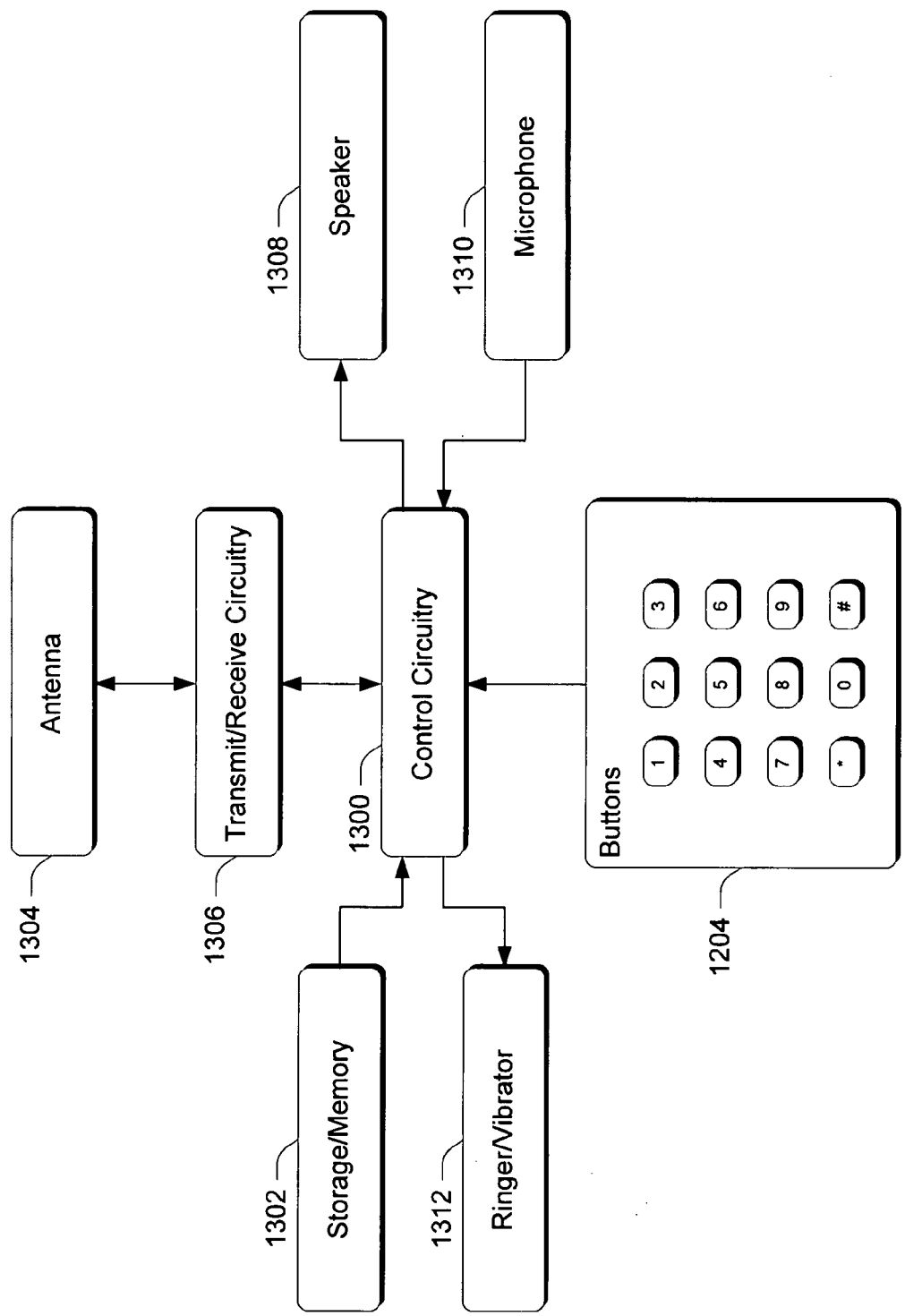
FIG. 13 is a block diagram that illustrates certain cellular phone system components.

FIG. 13 shows a block diagram of exemplary electronic circuitry of a typical cell phone. The circuitry includes control circuitry 1300 that can include one or more microprocessors, storage or memory 1302 (e.g., ROM, RAM etc.), an antenna 1304, transmit/receive circuitry 1306, a speaker 1308, a microphone 1310, and a ringer/vibrator 1312. The control circuitry 1300 controls transmission and reception of call and voice signals. During a transmission mode, control circuitry 1300 provides a voice signal from microphone 1310 to the transmit/receive circuitry 1306. The transmit/receive circuitry 1306 transmits the voice signal to a remote station (e.g., a fixed station, operator, other cellular phones, etc.) for communication through the antenna 1304. The ringer/vibrator 1312 is coupled to the control circuitry 1300, and is used to signal an incoming call to the user. The ringer/vibrator 1312 can emit a ringing or buzzing sound and/or tactile vibrations to indicate an incoming call.

During a receiving mode, on the other hand, the transmit/receive circuitry 1306 receives a voice signal from a remote station (e.g., a fixed station, operator, other cellular phones, etc.) through the antenna 1304. The control circuitry 1300 then provides the received voice signal from the transmit/receive circuitry 1306 to the speaker 1308, which provides audible signals for the user's hearing.

In the described embodiment, cell phone 1200 (FIG. 12) is a context/location-aware cell phone that is embodied with the capabilities described above. These capabilities permit the cell phone to ascertain its current context or location, and then adapt its behavior to the current context or location.

As an example, consider the following: In a movie theater, it is a courtesy to turn off one's cell phone ringer or to place the cell phone in a vibrate mode so that if a call is received, those around the call's recipient are not disturbed. Many people forget to adjust their cell phones when they are in a theater. Accordingly, if a person receives a telephone call, others around that person will be disturbed. Using the inventive techniques discussed above, the movie theater can put a location beacon in place that advertises itself as a specific location or location class. The cell phone, being aware of its location by virtue of the location beacon, can automatically turn its ringer off or reconfigure to vibrate mode.

As another example, consider the following: A user has their cell phone at home and has indicated a preference to have their cell calls forwarded to their home telephone because that phone has much better reception. The cell phone detects, through the inventive location service described above, that it is now located at home. Accordingly, whenever it receives a telephone call, it automatically forwards the call to the user's home telephone.

Exemplary Context/Location Aware Cell Phone Architecture

Figure 14:
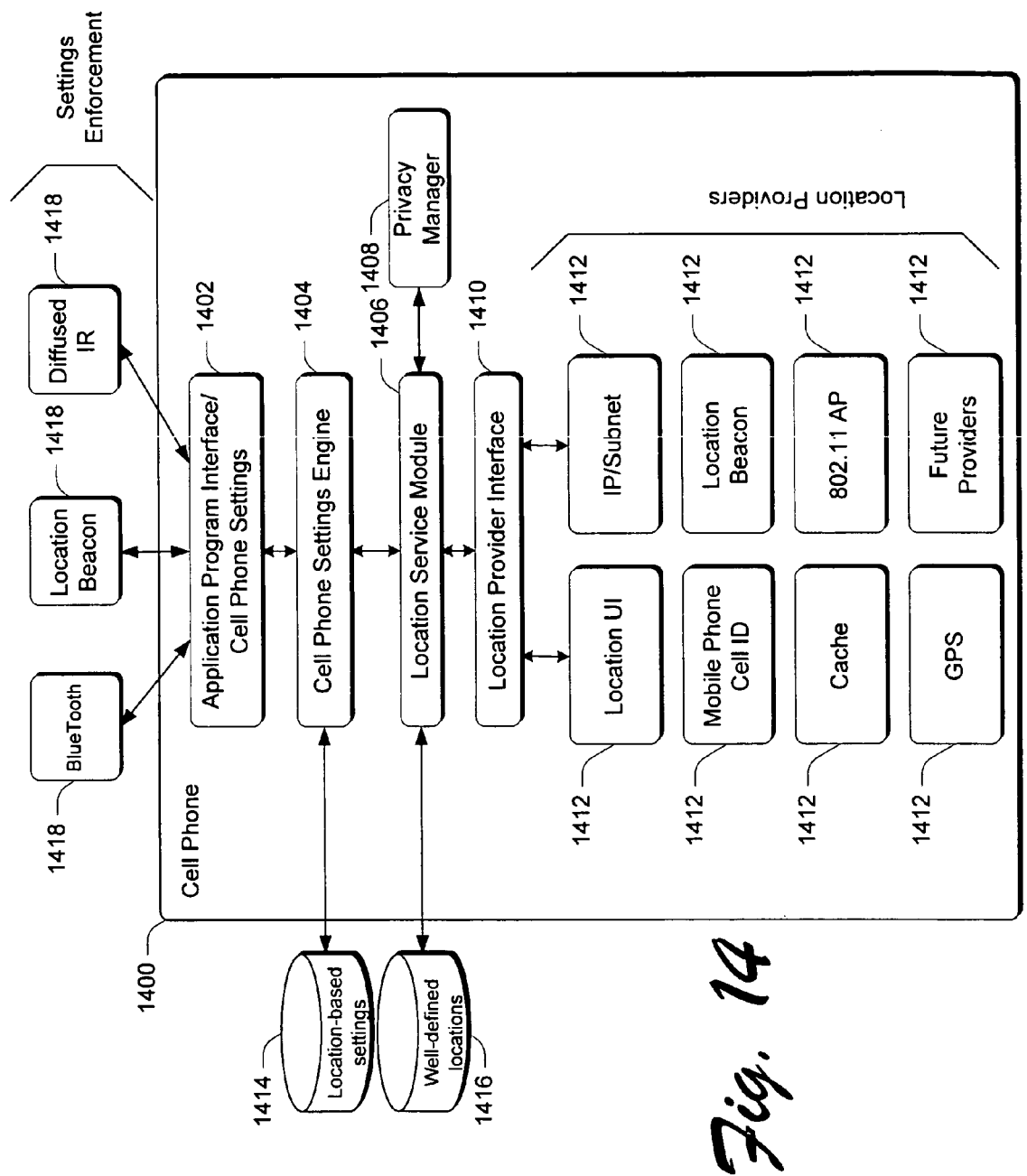
FIG. 14 is a block diagram of an exemplary software architecture in accordance with one embodiment.

FIG. 14 shows an exemplary cell phone architecture 1400 that can be used to implement the context/location aware cell phone described above and below. It is to be understood and appreciated that the described architecture constitutes but one exemplary architecture that is capable of implementing a context/location aware cell phone. Accordingly, other architectures can be used without departing from the spirit and scope of the claimed subject matter.

Architecture 1400 includes a number of components that are similar to or the same as components that are discussed above. Accordingly, these components are not discussed in much detail here. These components include location service module 1406 (which can also be considered as a context service module), location provider interface 1410, location providers 1412, privacy manager 1408.

A cell phone settings engine 1404 is provided and is communicatively linked to location service module 1406 and application program interface/cell phone setting module 1402. The cell phones setting engine 1404 is responsible for receiving context or location information from the location service module 1406 and responsive thereto, adjusting or otherwise manipulating a cell phone's settings SO that the cell phone behaves in a manner that is consistent with acceptable behaviors for a given location. That is, cell phones exhibit behaviors that in some locations might be appropriate and in others would not be. These behaviors include, without limitation, such things as (1) being on or off, (2) having a ringer turned on or off, (3) being in vibration mode as opposed to having a ringer turned on, (4) having low, medium and high pitch volumes, (5) forwarding calls to certain phone numbers, (6) functioning in a pager mode in which voice information is converted into text information, and the like.

Consider, for example, item (1) above. In the context or location of an airplane, the majority of the time a cell phone must be off. It is acceptable in such locations to have a cell phone on when, for example, the plane is sitting at the terminal gate. But, as soon as the plane pushes back from the terminal gate, passengers are typically informed by the flight attendants that their cell phones and other electronic apparatus must be turned off. In accordance with the described embodiment, and as described above and below, each cell phone on an airplane can be informed of its context or location, and can then automatically adjust its behavior by turning itself off until it is no longer located on the airplane. Additionally, consider item (2) above. In a movie theater, as noted above, it is common courtesy to turn one's cell phone off or place it in vibrate mode. Yet, many people forget or refuse to do so. Given the techniques and structures described above and below, cell phones that are determined to be in the location of a movie theater can automatically adjust their behavior to conform to acceptable norms.

In the described embodiment, cell phone settings and associated location information can be stored on the cell phone itself. Alternately, the cell phone is configured to receive cell phone setting information via application program interface/cell phone settings module 1402. Specifically, in one embodiment, a number of different settings enforcement entities 1418 can be provided that are responsible for transmitting cell phone settings information to cell phones that are in their vicinity. In the described example, such entities can include, without limitation, Blue Tooth entities, location beacons (as described above), diffused IR entities and the like. These entities transmit cell phone settings information that is received by the cell phone via interface 1402. This information is passed to the cell phone setting engine 1404 which then ensures that the cell phones is set to the proper setting.

Also included in this architecture is a source of location-based settings 1414, and a source of well-defined locations 1416. Location-based settings can come from any suitable source. For example, the settings can come from the settings enforcement entities mentioned above. Alternately, the location-based settings can be stored on the cell phone. Examples of this are given below. Similarly, the well-defined locations 1416 can come from any suitable source either on or off the device.

Figure 15:
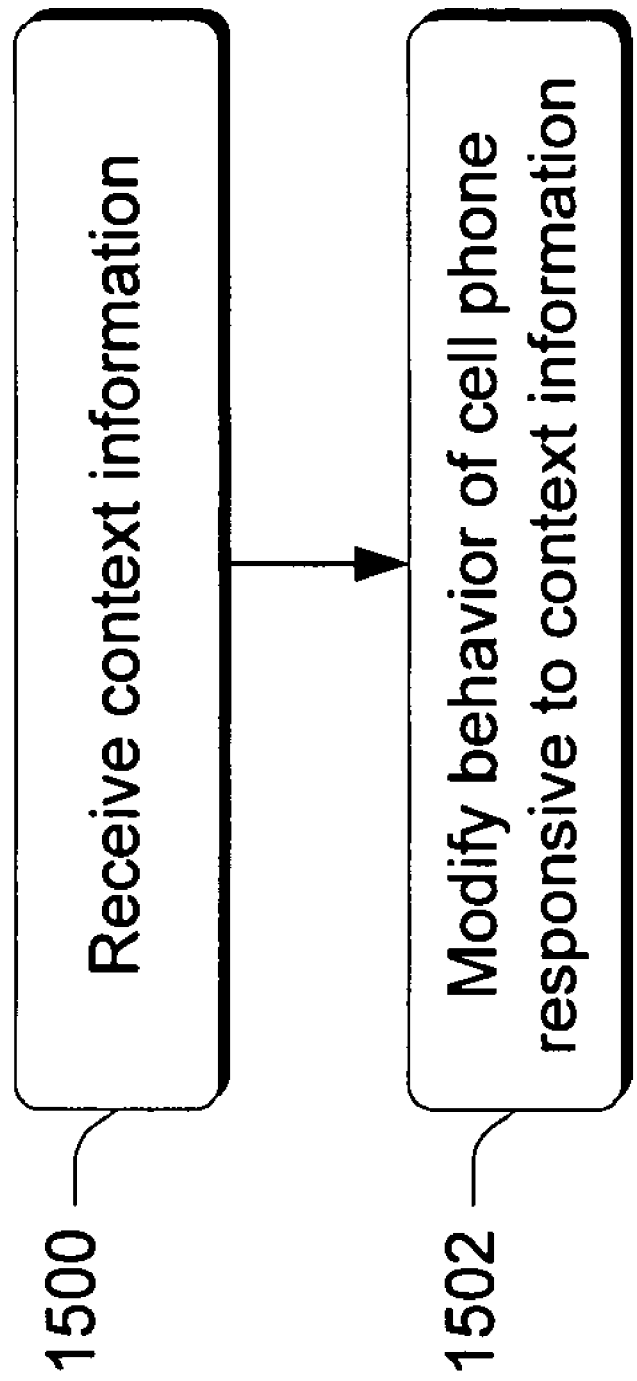
FIG. 15 is a flow diagram that describes steps in a method in accordance with one described embodiment.

FIG. 15 is a flow diagram that describes steps in a method in accordance with the described embodiment. The method can be implemented in any suitable hardware, software, firmware, or combination thereof. In the illustrated example, the method is implemented in software that is executing on a cell phone. One exemplary software architecture that is capable of implementing this method is described above in connection with FIG. 14. Other architectures can, of course, be used.

Step 1500 receives context information that pertains to the current context of a cell phone. Any suitable methods, techniques, or cell phone components can be used to receive this information. In addition, the context information can come from any type and/or number of context providers. Further, the context information can comprise any suitable type of context information. For example, location and user constitute two examples of specific context. The cell phone processes this information and step 1502 modifies the behavior of the cell phone responsive to the context information.

EXAMPLE

Figure 16:
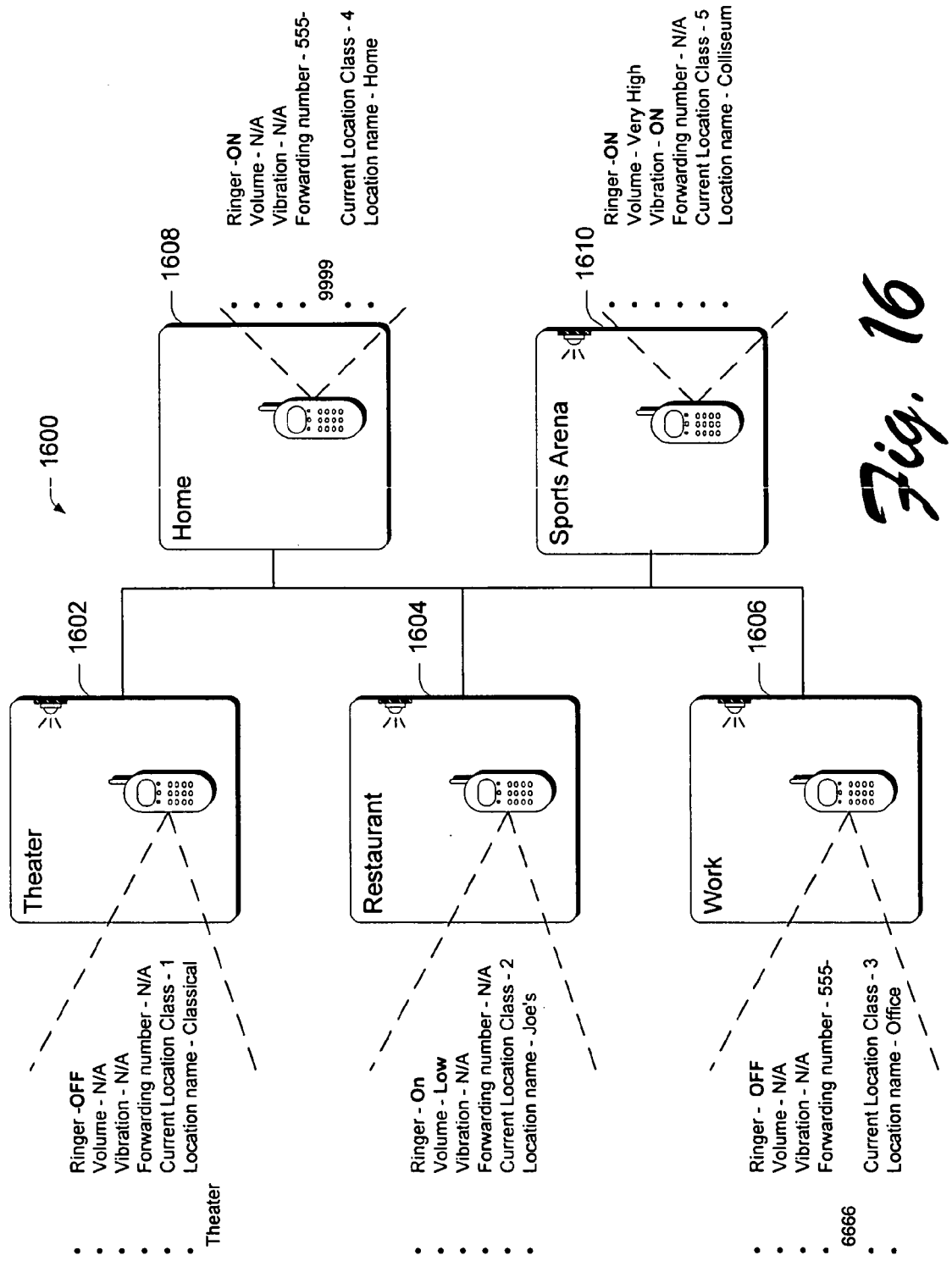
FIG. 16 is a diagram of a system in which one or more of the described embodiments can be employed.

FIG. 16 shows an exemplary system 1600 in which a context-aware cell phone is employed. In this system, as the cell phone enters different locations, it determines its location and then modifies its behavior in accordance with behaviors that are acceptable for that location. Alternately, the cell phone can simply receive information that is then used to adjust the cell phone's settings.

In the illustrated example, the different locations include a theater 1602, restaurant 1604, work 1606, home 1608, and a sports arena 1610. Notice that for the theater, restaurant, work and sports arena there are location beacons (not specifically designated) that can provide not only location information, but other information such as, but not limited to, cell phone settings. For each illustrated cell phone, there are a number of associated behaviors that can be modified given a particular location.

Notice in this example, that at each different location the cell phone exhibits a different behavior or set of behaviors that are appropriate for that location. For example, in the theater 1602, the cell phone ringer is OFF so that other movie patrons are not disturbed. In the restaurant 1604, the ringer is ON but the volume is low so as not to disturb fellow diners. At work, the cell phone is OFF but is in a mode to forward calls to a work number. At home 1608, the cell phone ringer is ON, but it is in a mode to forward calls to the home number. At the sports arena 1610, the ringer is ON and its volume is VERY HIGH. In addition, the phone is in vibration mode. This ensures that the user is most likely to receive their calls in the noisy arena.

In one embodiment, the association of location and behaviors is simplified through the use of multiple class types and various attributes that are associated with the class types. The class types define certain high level locations types. Each class type's attributes define the behavior of the cell phone when it is in the vicinity of an instance of that class. As an example consider theater 1602 which is an instance of a class type 1. The attributes associated with a class type 1 are that the cell phone ringer is OFF. No other attributes are associated with this class type. Restaurant 1604 is an instance of a class type 2. The attributes associated with this class type are that the cell phone ringer is ON and the volume is LOW. Work 1606 is an instance of a class type 3. Attributes associated with this class type are that the ringer is OFF and calls are automatically forwarded to an office phone. Home 1608 is an instance of a class type 4 whose attributes are that the ringer is ON and calls are automatically forwarded to a home telephone number. Sports arena 1610 is an instance of a class type 5 whose attributes include that the ringer is ON, the volume is VERY HIGH, and vibration mode is ON.

Figure 17:
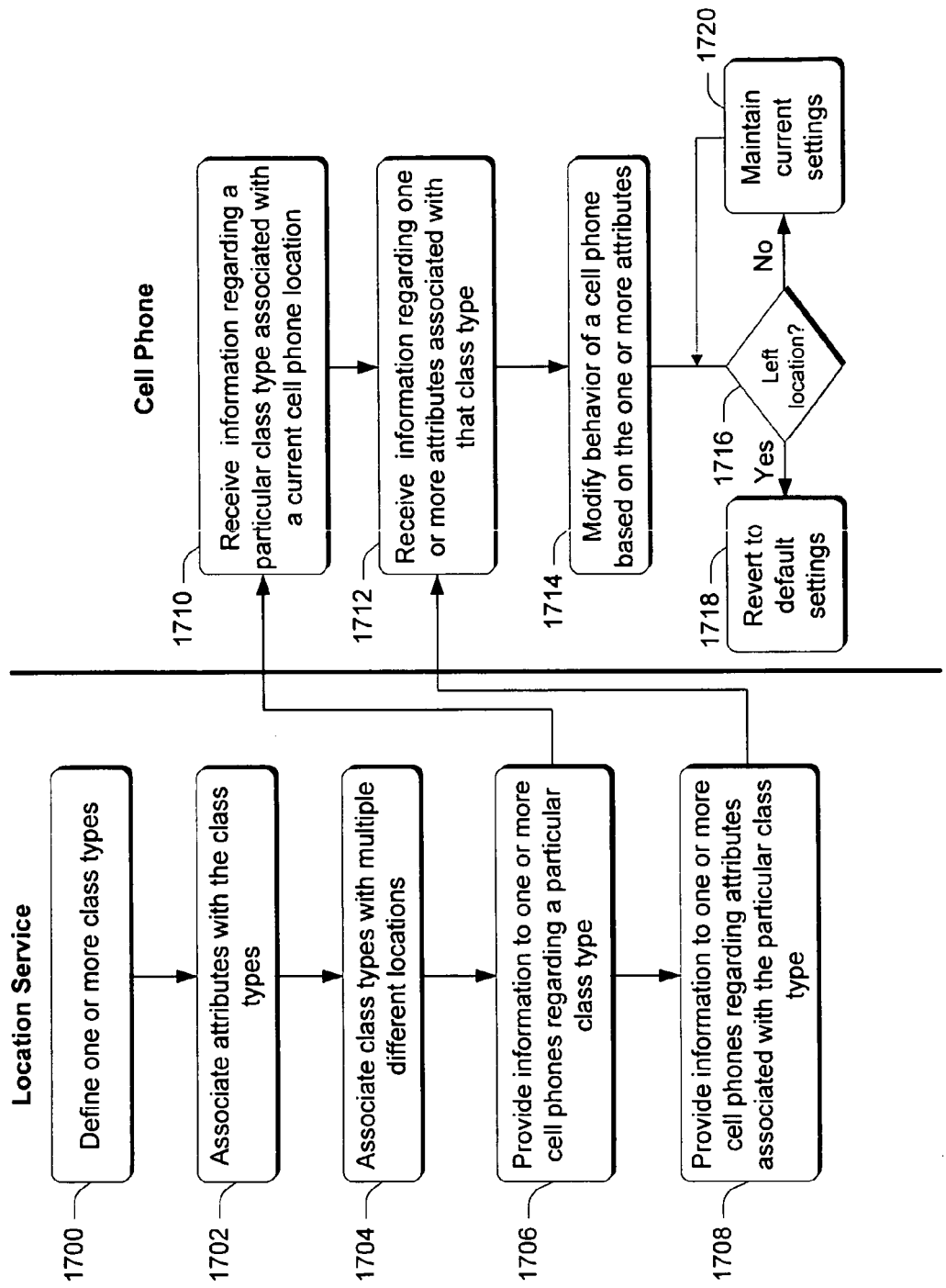
FIG. 17 is a flow diagram that describes steps in a method in accordance with one described embodiment.

FIG. 17 is a flow diagram that describes steps in a method in accordance with the described embodiment. The method can be implemented in any suitable hardware, software, firmware, or combination thereof. In the described embodiment the method is implemented in software. In the discussion that follows, the flow chart comprises two separate but related portions. The portion on the left designated "Location Service" comprises steps that can be implemented by a location service that is not onboard a cell phone. The flow chart portion on the right designated "Cell Phone" comprises steps that can be implemented by a context- or location-aware cell phone.

Step 1700 defines one or more class types and step 1702 associates attributes with the class types. The class types are intended to describe certain types of locations where, for example, certain cell phone behaviors are desired. The attributes that are associated with the class types define the cell phone behavior that is desired for that class type. Various examples of this are given in FIG. 16. For example, for a class type 1, attributes are that the ringer is turned off, and so on. Step 1704 associates class types with multiple different locations. Each location is associated with a class type. Accordingly, at these locations, cell phone behavior of location-aware cell phones can be governed by the attributes that are associated with that class type. This provides a simple infrastructure for implementing context-aware phones. By utilizing the concept of class types, those individuals who are in charge of overseeing the context-awareness of their particular locations need not be concerned with anything other than selecting the correct class type for their location. They can do this by simply reviewing the attributes that are associated with the different class types and then selecting an appropriate class type.

Step 1706 provides information to one or more cell phones regarding a particular class type for a given location. This information can be provided in any suitable manner and is typically provided when the cell phone enters the vicinity of the location. Recall that FIG. 14 described three settings enforcement entities in the form of Blue Tooth, location beacon, and diffused IR entities. These entities can wirelessly transmit the class type information to cell phones that are in their vicinity. Step 1708 provides information to one or more cell phones regarding attributes associated with the particular class type. This step informs the cell phones of the desired settings for that particular location.

Step 1710 receives information regarding a particular class type associated with a current cell phone location and step 1712 receives information regarding one or more attributes associated with that class type. It will be appreciated and understood that only the class type or only the attributes can be transmitted to the cell phone. In the former case, the cell phone can maintain in its storage the various settings that are associated with the class types (i.e. such as in a location-based settings store 1414 (FIG. 14)). In the latter case, the cell phone can simply process the attribute information and adjust its settings accordingly. Step 1714 modifies the behavior of the cell phone based on the attributes that it receives. Accordingly, the cell phone's behavior is modified in accordance with behaviors that are determined to be appropriate for the cell phone's location.

Step 1716 determines if the cell phone has left the current location. This step can be implemented in any suitable way. For example, there may be a separate location beacon near location exits that inform the cell phones that they are leaving the premises. Alternately, the strength of a beacon signal that signals the location may grow weak to a predetermined threshold so that the cell phone knows that it is no longer at the previous location. If step 1716 determines that the cell phone has left its current location, step 1718 reverts the cell phone to its default or previous settings. If, on the other hand, step 1716 determines that the cell phone has not left its current location, the current settings are maintained (step 1720).

In accordance with the described embodiments, context-aware or location-aware cell phones are provided. These phones can determine their particular context or location and then automatically configure themselves as by adjusting their settings. Doing so ensures that a cell phone's behavior is consistent with behaviors that have been determined to be appropriate for a given location.

CONCLUSION

The embodiments described above provide a uniform, standardized way to enhance the world of context aware computing. The embodiments provide a way for individuals to uniquely experience the world around them by ascertaining their location in the world in a standard way. The embodiments also provide a way for service providers to uniquely position their goods and services in a manner that is sensitive to and appreciates the contexts, e.g. locations, of various consumers of the goods and services. Unique and useful architectures and data structures are employed to facilitate the user's computing experience and provide for an individual-centric experience.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A cellular phone comprising:
   one or more processors configured to:
   receive information that pertains to a current context of the cellular phone;
   determine the current context based on the information and a hierarchy data structure of attributes, wherein each node of the data structure is capable of corresponding to a physical or logical context;
   modify at least one behavior of the cellular phone responsive to the current context, wherein at least one of said one behavior is defined by a third party; and
   an application program interface that is configured to wirelessly receive information that is associated with the phone's context.

2. The cellular phone of claim 1 further comprising a context service module that is configured to receive information from multiple different context providers.

3. The cellular phone of claim 1 the processors being further configured to automatically determine the current context by traversing at least one node of the data structure.

4. A method of operating a cellular phone comprising:
   wirelessly receiving, with the cellular phone, information that pertains to either a physical or logical context of the cellular phone, the cellular phone being configured to receive said information from different types of context providers that provide different forms of information;

responsive to said receiving and using only the cellular phone and its associated on-board componentry, determining a current context based upon the information and a hierarchy data structure of attributes; and modifying at least one behavior associated with the cellular phone responsive to the current context, wherein at least one of said one behavior is defined by a third party.

5. The method of claim 4, wherein the behavior pertains to whether the phone is on or off.

6. The method of claim 4, wherein the behavior pertains to operation of a cellular phone ringer.

7. The method of claim 4, wherein the behavior pertains to whether the cellular phone is in a vibration mode.

8. The method of claim 4, wherein the behavior pertains to a ringer pitch.

9. The method of claim 4, wherein the behavior pertains to forwarding calls.

10. The method of claim 4, wherein said modifying comprises using one or more cellular phone settings that are resident on the cellular phone to modify the cellular phone's settings.

11. The method of claim 4, wherein said receiving comprises receiving cellular phone setting information that is to be used to modify the cellular phone's behavior.

12. A cellular phone programmed to implement the method of claim 4.

13. The method of claim 4, wherein the information comprises one or more parameters selected from a group consisting of GPS specific information, a longitude, a latitude, internet protocol specific information, a cell identifier, a user entry, a city, a street, a building, network metadata, subnet and site information and a location type.

14. The method of claim 4, wherein the hierarchy data structure of attributes comprises:

a plurality of nodes, wherein each node is linked to one or more other nodes; and a plurality of attributes, wherein each attribute is associated with at least one node.

15. The method of claim 14, wherein the nodes are arranged in one or more plurality of classes selected from a group of abstractions consisting of a political abstraction, an administrative abstraction, a geographical abstraction, an infrastructure abstraction, a public place abstraction, a physical location abstraction and a logical location abstraction.

16. The method of claim 14, wherein determining the current context comprises mapping the information to a given node in the hierarchy data structure of attributes.

17. The method of claim 16, wherein each node is linked to one or more other nodes to form a plurality of branches having a root node.

18. The method of claim 17, wherein determining the current context further comprises:

traversing multiple nodes in a particular branch containing the given node; and ascertaining one or more of the attributes of the traversed nodes.

19. The method of claim 17, wherein determining the current context further comprises:

determining a proximity of nodes in other braches to the given node; and ascertaining one or more of the attributes of the proximate nodes.

20. The method of claim 14, wherein the attributes are one or more parameters selected from a group consisting of a unique identifier, a name, a geographic entity, a latitude, a longitude, a relative importance, a contextual parent an entity unique identifier, a location unique identifier, a uniform resource locator, a source, a start date, an end date, a modification date, a status date, a resource, a service, a time, a time zone, a privacy level and a cellular phone setting.

21. One or more readable media having readable instructions thereon which, when executed by a cellular phone, cause the cellular phone to:

wirelessly receive information from different context source information types that provide different forms of information that pertains to a context of the cellular phone;

responsive to receiving the information, determine the cellular phone context and modify at least one behavior associated with the cellular phone based on the information and a hierarchy data structure of attributes, wherein at least one of said one behavior is defined by a third party and wherein each node of the data structure being capable of corresponding to either a physical or logical context.

22. A cellular phone embodying the computer-readable media of claim 21.

23. A cellular phone comprising:

multiple different types of location providers which collectively are configured to receive different forms of location information that can be used by the cellular phone to ascertain its location; and one or more processors configured to:

receive information associated with a current location of the cellular phone; and modify at least one behavior of the cellular phone responsive to the information and a hierarchy tree structure associating physical or logical locations to a plurality of atributes, wherein at least one of said one behavior is defined by a third party.

24. The cellular phone of claim 23, wherein the information comprises cellular phone settings.

25. The cellular phone of claim 23, wherein the one or more processors are configured to modify the one behavior by turning the phone on or off.

26. The cellular phone of claim 23, wherein the one or more processors are configured to modify the one behavior by adjusting a ringer pitch on the phone.

27. The cellular phone of claim 23, wherein the one or more processors are configured to modify the one behavior by turning a cellular phone ringer on or off.

28. The cellular phone of claim 23, wherein the one or more processors are configured to modify the one behavior by placing the phone in a vibration mode.

29. The cellular phone of claim 23, wherein the one or more processors are configured to modify the one behavior by forwarding one or more calls to a user-provided telephone number.

30. A cellular phone comprising:

receiving means configured to wirelessly receive multiple different forms of information that pertains to a current location of a cellular phone and use said multiple different forms of information to ascertain the current location; and means to modify at least one behavior associated with the cellular phone responsive to the current location and a hierarchy data structure associating physical or logical locations to a plurality of attributes, wherein at least one of said one behavior is defined by a third party.

31. The cellular phone of claim 30, wherein said information pertains to cellular phone settings that are associated with the current location.

32. The cellular phone of claim 30, wherein said information pertains to a defined location type associated with multiple different locations, of which the location is an instance.

33. The cellular phone of claim 30, wherein said means to modify comprises means to change the cellular phone's behavior when it is no longer at the current location.

34. A method of operating a cellular phone comprising:
providing a cellular phone; and
determining, with the cellular phone, a present cellular phone location wherein said determining comprises:
receiving location information;
accessing one or more hierarchical tree structures having nodes, each node being capable of corresponding to either a physical or logical location; and
using the location information to traverse at least portions of the one or more tree structures to ascertain the present location.

35. A cellular phone comprising:
one or more computer-readable media;
one or more hierarchical traversable tree structures resident on the computer-readable media, the tree structures comprising individual nodes, each of which is capable of being associated with either a physical or logical phone context; and
one or more processors configured to:
receive information that pertains to a current context of the cellular phone;
automatically determine the current context based on the information by traversing at least one node on one of the trees; and
modify at least one behavior of the cellular phone responsive to the current context.

36. The cellular phone of claim 35 further comprising a context service module that is configured to receive information from multiple different context providers.

37. A cellular phone comprising:
a context service module that is configured to receive different forms of information from multiple different types of context providers; and
one or more processors associated with the context service module and configured to:
receive information that pertains to a current context of the cellular phone;
determine the current context based on the information and a hierarchy data tree of attributes, wherein levels of the hierarchy tree of attributes are arranged in one or more classes selected from a group consisting of a political abstraction, an administrative abstraction, and organization abstraction, a geographical abstraction, an infrastructure abstraction, a public place abstraction and a private entity abstraction; and
modify at least one behavior of the cellular phone responsive to the current context, wherein at least one of said one behavior is defined by a third party.

38. The cellular phone of claim 37 further comprising the processors being configured to automatically determine the context by traversing at least one node of the hierarchy data tree of attributes.

39. The cellular phone of claim 37 further comprising an application program interface that is configured to wirelessly receive information that is associated with the phone's context.

40. A cellular phone comprising:
location provider means for receiving different forms of location information;
means for ascertaining a current location from the different forms of location information;
means for determining a context from the current location and a hierarchy tree structure, wherein the hierarchy tree structure comprises:
a plurality of nodes, wherein each node is linked to one or more other nodes;
a plurality of attributes corresponding to either a physical or logical context wherein each attribute is associated with at least one node; and
means for modifying at least one behavior associated with the cellular phone responsive to the context.

* * * * *

UNITED STATES PATENT AND TRADEMARK OFFICE
CERTIFICATE OF CORRECTION

PATENT NO. : 7,076,255 B2
APPLICATION NO. : 09/746918
DATED : July 11, 2006
INVENTOR(S) : Parupudi et al.

It is certified that error appears in the above-identified patent and that said Letters Patent is hereby corrected as shown below:

On the Title Pg, on page 2, Item (56), under "U.S. Patent Documents", line 65, after "6,411,899" delete "B1" and insert -- B2 --, therefor.

On the Title Pg, on page 2, Item (56), under "U.S. Patent Documents", line 66, after "6,418,533" delete "B1" and insert -- B2 --, therefor.

On the Title Pg, on page 2, Item (56), under "Other Publications", line 20, delete "ramework" and insert -- Framework --, therefor.

In column 6, line 16, delete "indentifier" and insert -- identifier --, therefor.

In column 7, line 46, delete "start-Up" and insert -- start-up --, therefor.

In column 10, line 49, delete "tot eh" and insert -- to the --, therefor.

In column 18, line 7, after "704" insert -- , --.

In column 18, line 38, delete "SO" and insert -- so --, therefor.

In column 27, line 10, delete "SO" and insert -- so --, therefor.

In column 31, line 64, in Claim 19, delete "braches" and insert -- branches --, therefor.

In column 32, line 4, in Claim 20, after "parent" insert -- , --.

In column 32, line 37, in Claim 23, delete "atributes" and insert -- attributes --, therefor.

In column 34, line 38, in Claim 40, after "context" insert -- , --.

Signed and Sealed this

Thirtieth Day of March, 2010

David J. Kappos
*Director of the United States Patent and Trademark Office*